(12) United States Patent
Ichikawa

(10) Patent No.: US 9,329,040 B2
(45) Date of Patent: May 3, 2016

(54) ANGULAR VELOCITY SENSOR AND METHOD OF MANUFACTURE

(75) Inventor: Fumio Ichikawa, Ebina (JP)

(73) Assignee: Seiko Epson Corporation (JP)

( * ) Notice: Subject to any disclaimer, the term of this patent is extended or adjusted under 35 U.S.C. 154(b) by 554 days.

(21) Appl. No.: 13/608,480

(22) Filed: Sep. 10, 2012

(65) Prior Publication Data

US 2013/0074597 A1   Mar. 28, 2013

(30) Foreign Application Priority Data

Sep. 26, 2011 (JP) ................. 2011-209632

(51) Int. Cl.
*G01C 19/00* (2013.01)
*G01C 19/5628* (2012.01)
*G01C 19/5642* (2012.01)

(52) U.S. Cl.
CPC ........ *G01C 19/5628* (2013.01); *G01C 19/5642* (2013.01); *Y10T 29/42* (2015.01)

(58) Field of Classification Search
CPC ........... G01C 19/5719; G01C 19/5607; G01C 19/56; G01C 19/5642; G01C 19/5628; G01C 16/5642; Y10T 29/42
USPC ..................... 73/504.15, 504.12, 504, 504.14
See application file for complete search history.

(56) References Cited

U.S. PATENT DOCUMENTS

| | | | |
|---|---|---|---|
| 4,954,741 A * | 9/1990 | Furutsu et al. | 310/316.02 |
| 5,343,749 A | 9/1994 | Macy | |
| 5,522,249 A | 6/1996 | Macy | |
| 5,866,816 A * | 2/1999 | Hulsing, II | 73/504.16 |
| 6,490,925 B2 | 12/2002 | Inoue et al. | |
| 7,216,540 B2 | 5/2007 | Inoue et al. | |
| 7,528,533 B2 | 5/2009 | Ochi et al. | |
| 7,975,546 B2 | 7/2011 | Noguchi et al. | |
| 8,701,487 B2 | 4/2014 | Naruse et al. | |
| 2012/0126664 A1 | 5/2012 | Ogura et al. | |
| 2013/0074597 A1 | 3/2013 | Ichikawa | |
| 2013/0081473 A1 | 4/2013 | Ichikawa | |
| 2013/0283910 A1 | 10/2013 | Nishizawa et al. | |
| 2013/0285508 A1 | 10/2013 | Nakagawa | |
| 2013/0320812 A1 | 12/2013 | Yamaguchi et al. | |

FOREIGN PATENT DOCUMENTS

| | | |
|---|---|---|
| JP | 05-256723 | 10/1993 |
| JP | 08-327366 | 12/1996 |
| JP | 10-078326 | 3/1998 |
| JP | 2006-054602 | 2/2006 |
| JP | 2008-014887 | 1/2008 |
| JP | 20008-209215 | 9/2008 |
| JP | 2012-112748 | 6/2012 |

* cited by examiner

*Primary Examiner* — Max Noori
(74) *Attorney, Agent, or Firm* — Harness, Dickey & Pierce, P.L.C.

(57) ABSTRACT

A sensor element has drive vibrating arms drive-vibrating by energization, adjustment vibrating arms vibrating with the drive vibrations of the drive vibrating arms, detection electrodes outputting charge in response to physical quantities applied to the drive vibrating arms, first electrodes provided on the adjustment vibrating arms, electrically connected to the detection electrodes, and outputting charge with the vibrations of the adjustment vibrating arms, and a pair of second electrodes provided on the adjustment vibrating arms, electrically connected to a pair of detection electrodes, and outputting charge having an opposite polarity to that of the first electrodes with the vibrations of the adjustment vibrating arms.

23 Claims, 16 Drawing Sheets

ANGULAR VELOCITY SENSOR AND METHOD OF MANUFACTURE

The entire disclosure of Japanese Patent Application No. 2011-209632, filed Sep. 26, 2011 is expressly incorporated by reference herein.

BACKGROUND

1. Technical Field

The present invention relates to a sensor element, a manufacturing method of the sensor element, a sensor device, and an electronic apparatus.

2. Related Art

As sensor elements, for example, angular velocity sensors (vibration gyro sensors) that detect physical quantities such as angular velocities and acceleration used for vehicle body control in vehicles, self-location detection of car navigation systems, vibration control correction of digital cameras, video cameras, etc. (so-called camera shake correction) have been known (for example see Patent Document 1 (JP-A-2008-14887)).

For example, the angular velocity sensor disclosed in the patent document has a tuning fork including two arms and a connection part that connects one ends of the two arms. Further, in the angular velocity sensor disclosed in Patent Document 1, the turning fork is formed using a non-piezoelectric material, and a drive part and a detection part including a piezoelectric thin film inserted between a pair of electrodes are respectively formed in each arm.

In the angular velocity sensor disclosed in Patent Document 1, by applying a voltage to the pair of electrodes of the drive part, the arm is flexurally vibrated (driven). Further, under the drive condition, when the arm is subjected to an angular velocity around an axis line along the extension direction thereof, the arm bends in a direction orthogonal to the above described drive direction by Coriolis force, and electric charge in response to the amount of bending is detected from the pair of electrodes of the detection part. The angular velocity may be detected based on the detected charge.

Incidentally, the above described tuning fork having the two arms is generally formed by etching processing of a substrate. In this regard, it is difficult to make the dimensions of the tuning fork as designed due to etching anisotropy of the substrate, variations of processing process, or the like. Accordingly, the tuning fork may have an unintended shape and, even when the arm is not subjected to any angular velocity, the arm may bend in a direction different from the drive direction. If the electric charge generated from the pair of electrodes of the detection part as the arm bends, reduction in detection sensitivity is caused.

On this account, in the angular velocity sensor disclosed in Patent Document 1, one electrode of the pair of electrodes of the detection part is partially removed and the amount of charge output from the pair of electrodes of the detection part when the arm is not subjected to any angular velocity is adjusted.

However, in the angular velocity sensor disclosed in Patent Document 1, there has been a problem that the adjustment range of the amount of charge output from the pair of electrodes of the detection part is smaller, and, as a result, it may be impossible to perform desired adjustment.

SUMMARY

An advantage of some aspects of the invention is to provide a sensor element that may exert advantageous detection sensitivity, a manufacturing method of the sensor element, a sensor device, and provide an electronic apparatus with higher reliability including the sensor device.

Application Example 1

This application example of the invention is directed to a sensor element including a base part, a drive vibrating arm extended from the base part and drive-vibrating, a vibrating arm extended from the base part and vibrating with the drive vibration of the drive vibrating arm, a detection part containing a detection electrode that outputs a signal in response to a physical quantity applied to the drive vibrating arm, a first electrode provided on the vibrating arm, electrically connected to the detection electrode, and generating charge with the vibration of the vibrating arm, and a second electrode provided on the vibrating arm, electrically connected to the detection electrode, and generating charge having an opposite polarity to that of the charge generated from the first electrode with the vibration of the vibrating arm.

According to the sensor element having the above described configuration, a value obtained by adding a difference between the charge generated in the first electrode and the charge generated in the second electrode to an amount of charge generated in the detection electrode may be output as a sensor output.

Further, by removing part or all of the first electrode or the second electrode, the amount of charge generated in the first electrode or the second electrode may be reduced and the sensor output may be adjusted. Specifically, the sensor output may be adjusted (corrected) so that the sensor output under a condition that no physical quantity is applied to the sensor element may be a desired reference value (for example, zero).

Specifically, the first electrode and the second electrode generate charge with opposite polarities to each other, and thus, in either case where the sensor output when no physical quantity is applied to the sensor element is larger or smaller than the desired reference value, by selecting one electrode of the first electrode and the second electrode and removing part or all of the electrode, the sensor output when no physical quantity is applied to the sensor element may be adjusted to the desired reference value.

Furthermore, a pair of the first electrodes and a pair of the second electrodes are respectively provided on a vibrating arm separating from the drive vibrating arm, and thus, the electrode areas of the first electrode and the second electrode may be made larger than those in the configuration in which the pair of first electrodes and the pair of second electrodes are provided on the drive vibrating arm. Accordingly, an adjustment range of the sensor output may be made wider.

In addition, since both the pair of first electrodes and the pair of second electrodes are provided on one vibrating arm, downsizing may be realized compared to the case where the pair of first electrodes and the pair of the second electrodes are provided on separate vibrating arms.

Application Example 2

In the sensor element according to the above application example of the invention, it is preferable that a sum of the charge from the first electrode and the charge from the second electrode has an opposite polarity to that of the charge generated from the detection electrode when no physical quantity is applied to the drive vibrating arm.

Thereby, the sensor output may be adjusted (corrected) so that the sensor output under the condition that no physical quantity is applied to the sensor element may be a desired reference value (for example, zero).

Application Example 3

In the sensor element according to the above application example of the invention, it is preferable that the vibrating arm has a first surface, a second surface opposite to the first surface, a pair of side surfaces connecting the first surface and the second surface, the first electrode includes first principal surface electrodes provided on the first surface and the second surface, and a first side surface electrode provided on one of the side surfaces along an extension direction of the vibrating arm, and the second electrode includes second principal surface electrodes provided on the first surface and the second surface side by side with the first electrodes, and a second side surface electrode provided on the other of the side surfaces along the extension direction of the vibrating arm.

Thereby, the sensor output may be adjusted (corrected) so that the sensor output under the condition that no physical quantity is applied to the sensor element may be a desired reference value (for example, zero).

Application Example 4

In the sensor element according to the above application example of the invention, it is preferable that a mass adjustment part is provided in an end part of the vibrating arm.

Thereby, the resonance frequency of the vibrating arm may be adjusted. Accordingly, the resonance frequency of the vibrating arm may be made closer to the frequency of the drive vibration of the drive vibrating arm, the amplitude of the vibration of the vibrating arm with the drive vibration of the drive vibrating arm may be increased, and thereby, the potential difference between the pair of first electrodes and the pair of second electrodes may be increased. As a result, the adjustment range of the sensor output may be made wider.

Application Example 5

In the sensor element according to the above application example of the invention, it is preferable that at least one of the first electrode and the second electrode includes a common part provided along the extension direction of the vibrating arm and plural branch parts branched from the common part.

Thereby, by cutting the intermediate part of at least one branch part of the plural branch parts of the first electrode or the second electrode or the intermediate part of the common part, the potential difference between the pair of first electrodes and the pair of second electrodes may be reduced and the sensor output may be adjusted.

Specifically, since the plural branch parts are branched from the common part, even when an arbitrary branch part is cut, the electrical connection of the other branch parts to the detection electrode may be maintained.

Application Example 6

In the sensor element according to the above application example of the invention, it is preferable that, in the plural branch parts, an electrode width at the tip end side is larger than the common part side.

Thereby, the electrode areas of the first electrode and the second electrode before adjustment (before cutting of the intermediate part of the common part or the branch part) may be secured larger, and the adjustment range of the sensor output may be made wider by cutting of the intermediate part of the common part or the branch part and the intermediate part of the branch part may be cut relatively easily.

Application Example 7

In the sensor element according to the above application example of the invention, it is preferable that the branch parts are tilted with respect to the extension direction of the common part.

Thereby, the intermediate part of the branch part may be cut relatively easily.

Application Example 8

In the sensor element according to the above application example of the invention, it is preferable that the vibrating arm has a groove part provided along the extension direction, and at least a part of the branch parts is provided on a wall surface of the groove part.

Thereby, in the case where the vibrating arm is formed using a piezoelectric material, the potential difference between the pair of first electrodes and the pair of second electrodes may be increased. Accordingly, the adjustment range of the sensor output may be made wider.

Application Example 9

In the sensor element according to the above application example of the invention, it is preferable that a detection vibrating arm extended from the base part and vibrating in response to the physical quantity applied to the drive vibrating arm is provided and the detection electrode is provided on the detection vibrating arm.

Thereby, the electrode area of the detection electrode may be increased. Accordingly, the detection sensitivity of the sensor element may be improved.

Application Example 10

This application example of the invention is directed to a manufacturing method of a sensor element including a base part, a drive vibrating arm extended from the base part and drive-vibrating, a vibrating arm extended from the base part and vibrating with the drive vibration of the drive vibrating arm, a detection part containing a detection electrode that outputs a signal in response to a physical quantity applied to the drive vibrating arm, a first electrode provided on the vibrating arm, electrically connected to the detection electrode, and generating charge with the vibration of the vibrating arm, and a second electrode provided on the vibrating arm, electrically connected to the detection electrode, and generating charge having an opposite polarity to that of the charge generated from the first electrode with the vibration of the vibrating arm. The method includes adjusting an amount of charge generated in the first electrode or the second electrode by removing part or all of the first electrode or the second electrode.

According to the manufacturing method of a sensor element, the sensor element that can exert advantageous detection sensitivity may be obtained simply and reliably.

Application Example 11

In the manufacturing method of the sensor element according to the above application example of the invention, it is preferable to include measuring charge generated in the detection electrode under a condition that the drive vibrating arm is energized and vibrated, and adjusting a resonance frequency of the vibrating arm based on a measurement result thereof.

Thereby, the sensor element that can exert advantageous detection sensitivity may be obtained simply and reliably.

Application Example 12

This application example of the invention is directed to a sensor device which preferably includes the sensor element according to the above application example of the invention, and a circuit that drives the sensor element and a circuit that detects an output from the detection part.

Thereby, the sensor device having advantageous detection sensitivity may be provided at low cost.

Application Example 13

This application example of the invention is directed to an electronic apparatus including the sensor element according to the above application example of the invention.

Thereby, the electronic apparatus having advantageous reliability may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a sensor element, a characteristics adjustment method of the sensor element, a sensor device, and an electronic apparatus of the invention will be explained with reference to embodiments shown in the accompanying drawings.

First Embodiment

First, the first embodiment of the invention will be explained.

Figure 1:
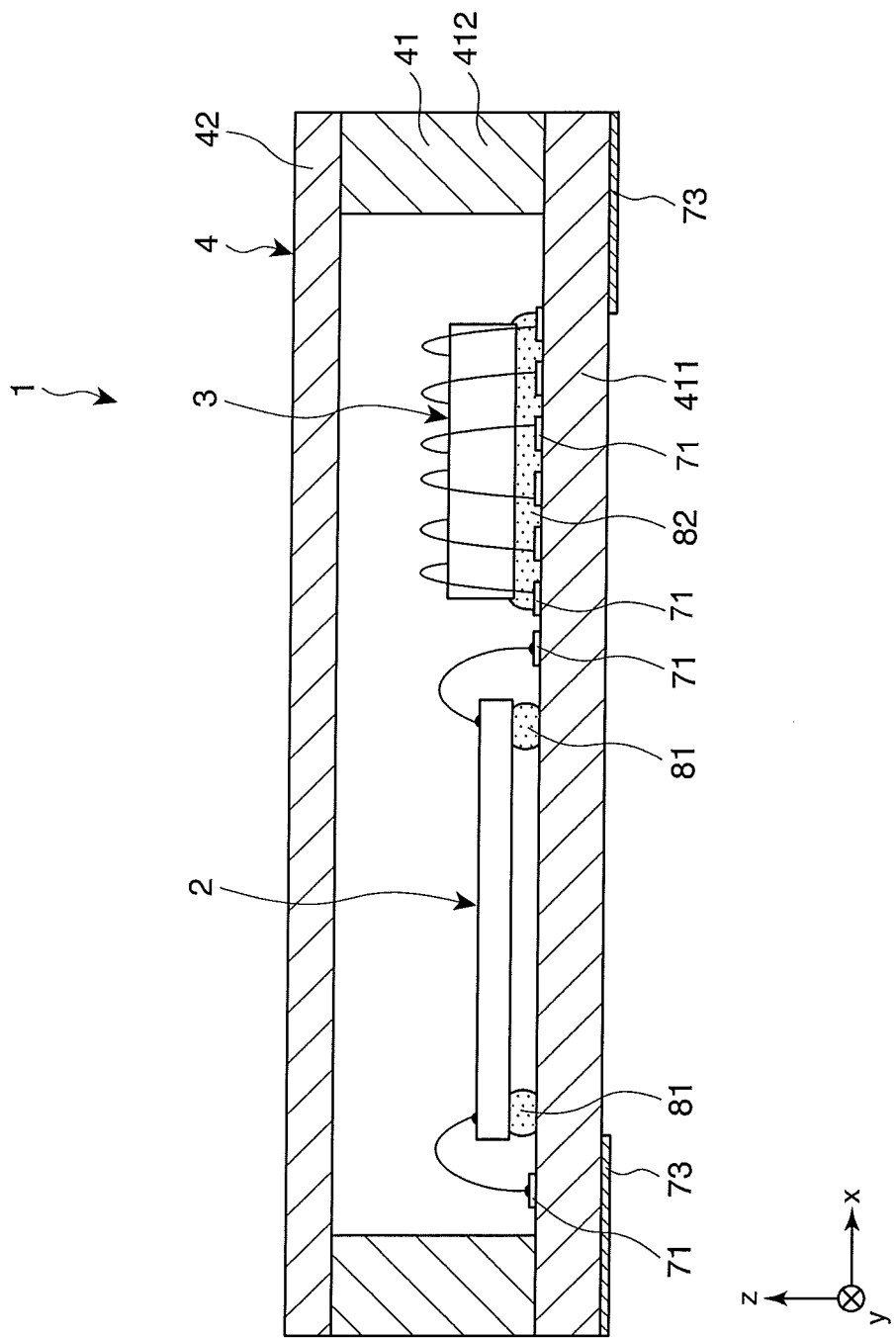
FIG. 1 is a schematic sectional view showing a general configuration of a sensor device (electronic device) according to a first embodiment of the invention.
Figure 2:
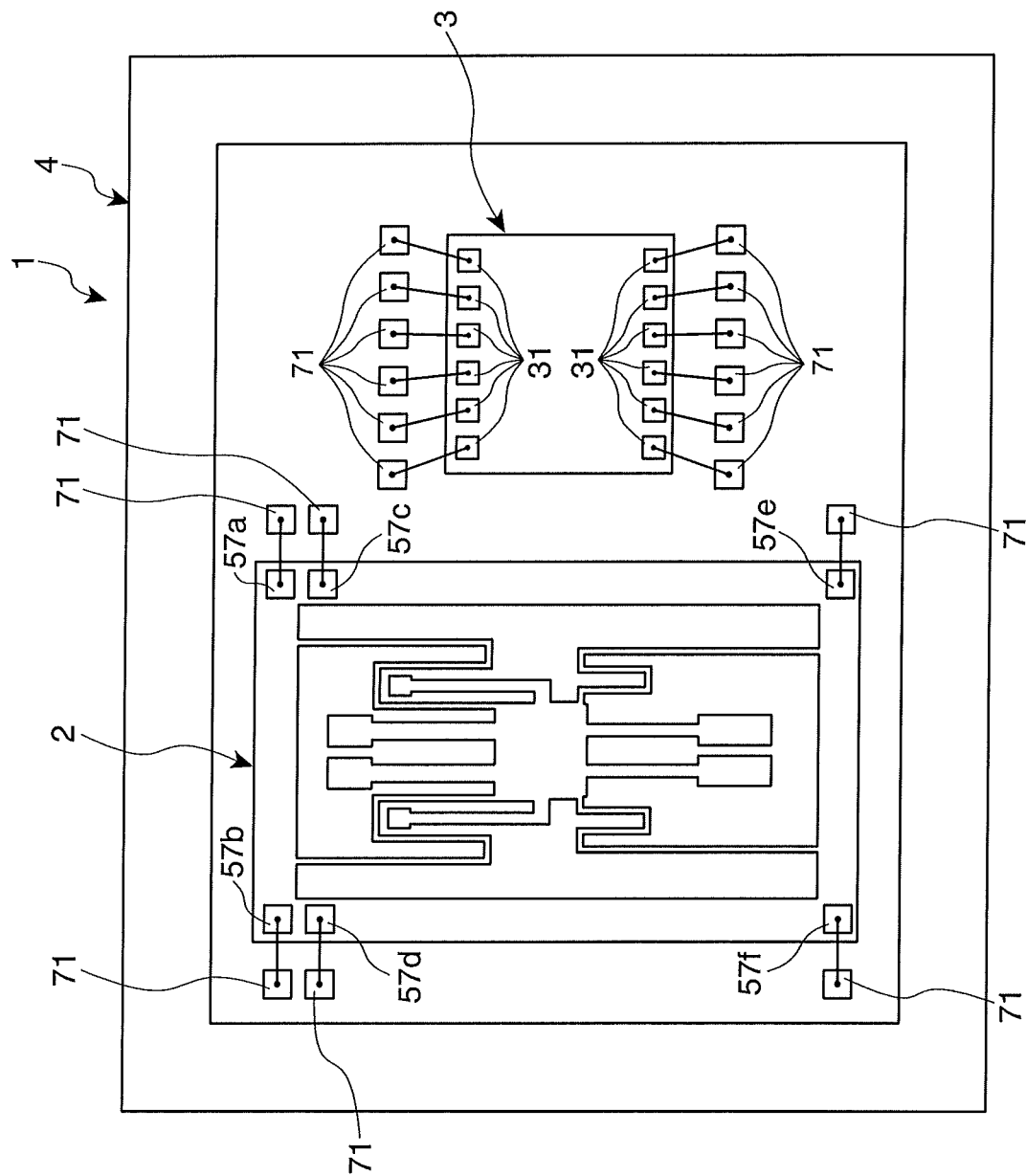
FIG. 2 is a plan view of the sensor device shown in FIG. 1.
Figure 3:
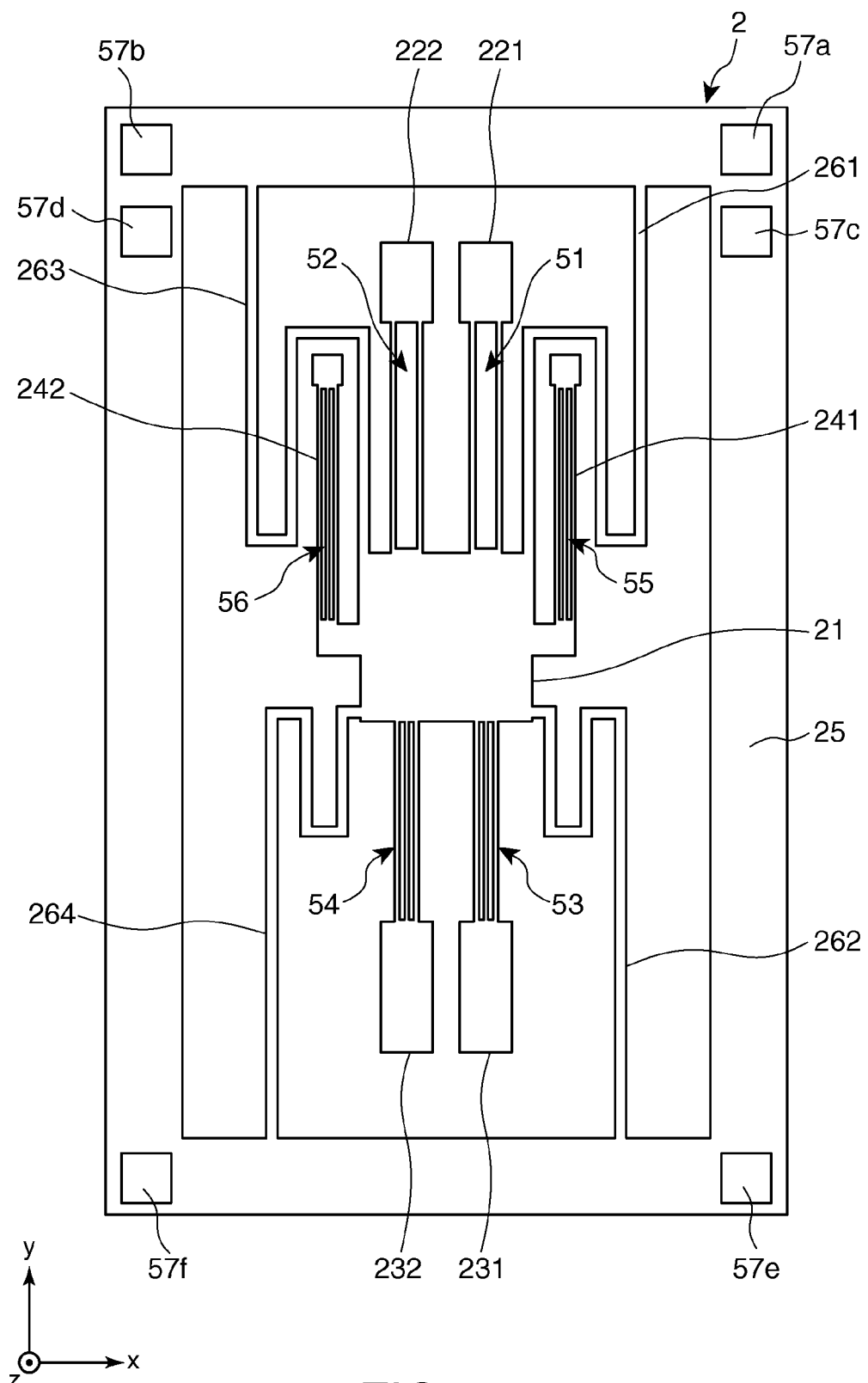
FIG. 3 is a plan view showing a sensor element provided in the sensor device shown in FIG. 1.
Figure 4A:
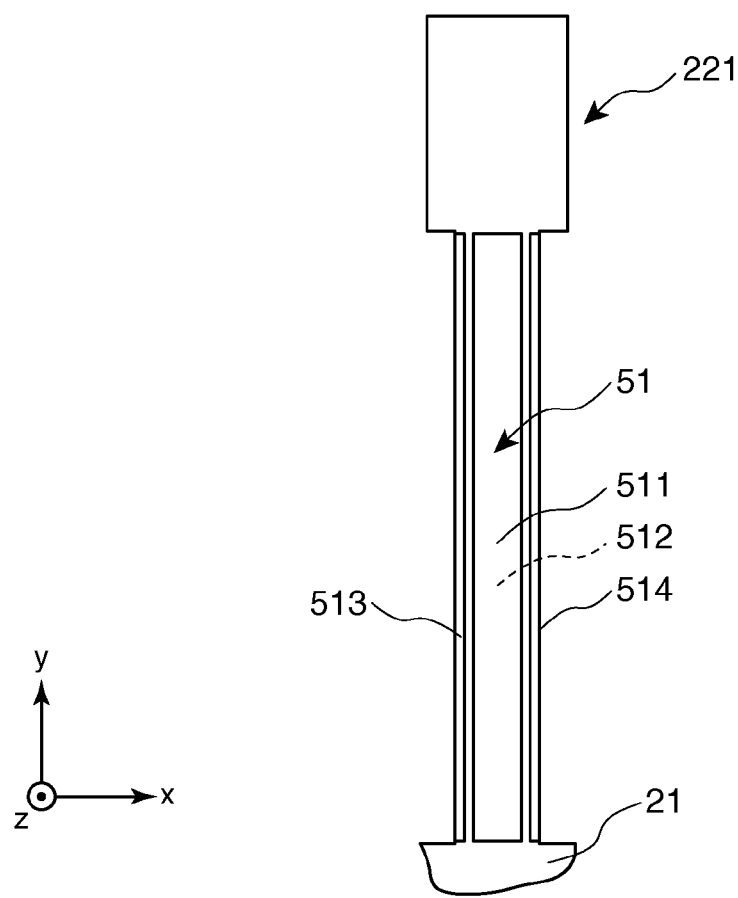
FIG. 4A is an enlarged plan view showing a drive vibrating arm of the sensor element shown in FIG. 3.
Figure 4B:
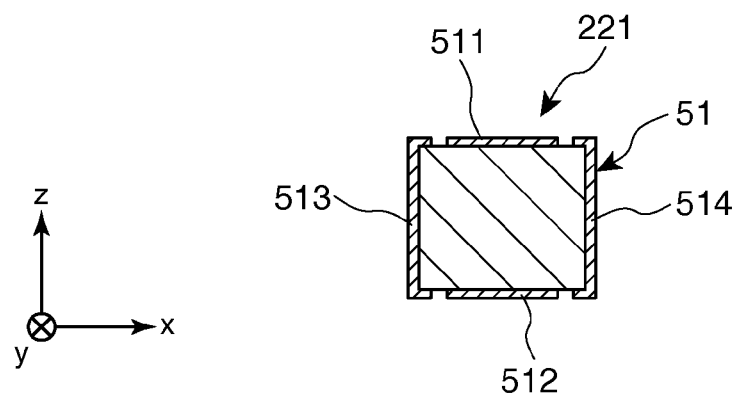
FIG. 4B is a sectional view of the drive vibrating arm shown in FIG. 4A.
Figure 5A:
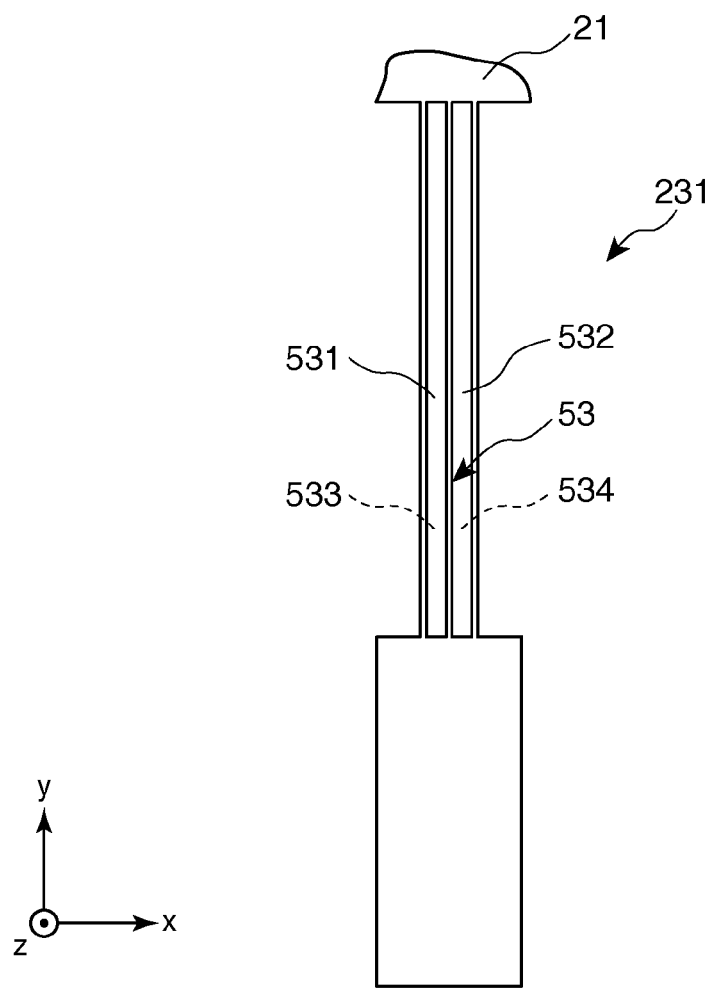
FIG. 5A is an enlarged plan view showing a detection vibrating arm of the sensor element shown in FIG. 3.
Figure 5B:
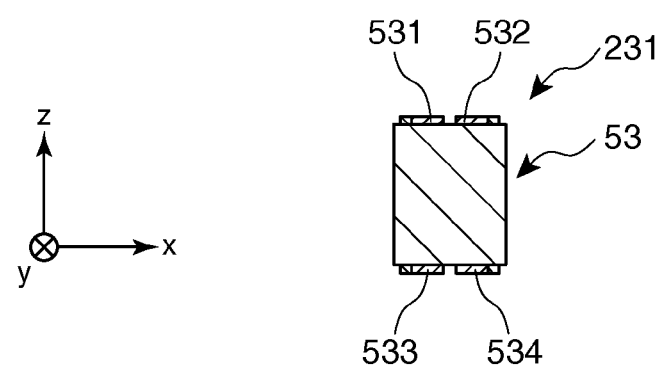
FIG. 5B is a sectional view of the detection vibrating arm shown in FIG. 5A.
Figure 6A:
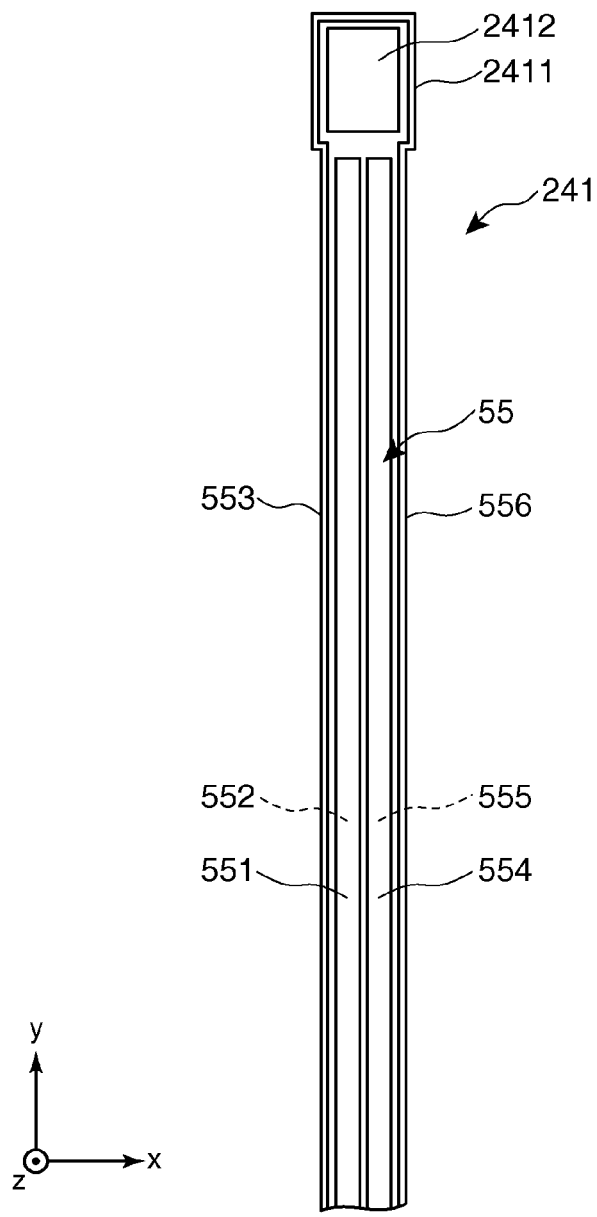
FIG. 6A is an enlarged plan view showing an adjustment vibrating arm of the sensor element shown in FIG. 3.
Figure 6B:
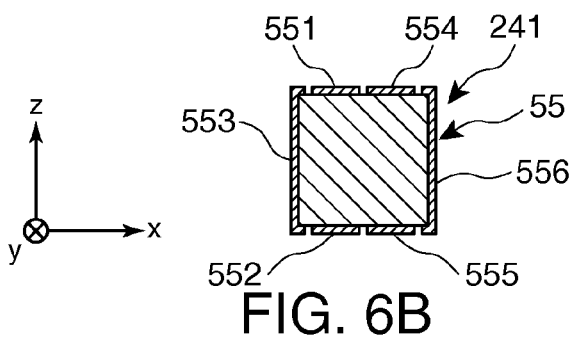
FIG. 6B is a sectional view of the adjustment vibrating arm shown in FIG. 6A.
Figure 7:
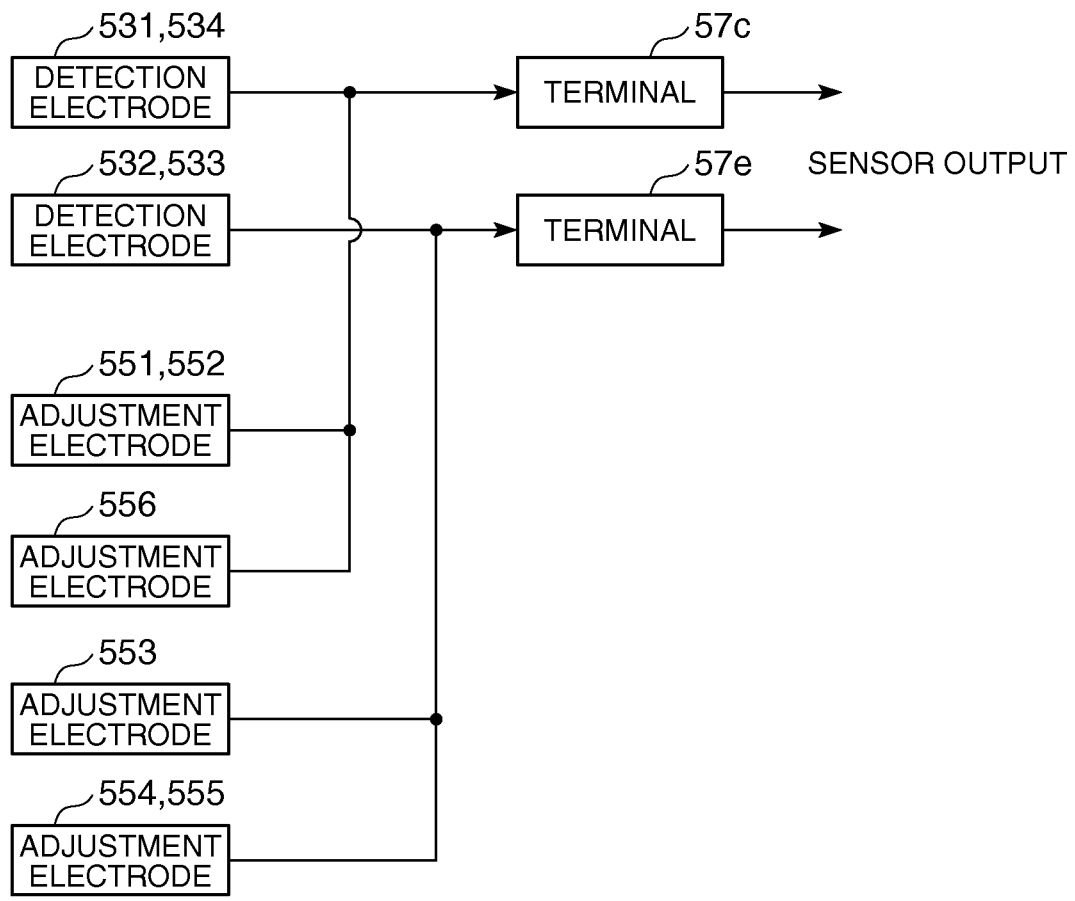
FIG. 7 shows a connection condition of detection electrodes, first adjustment electrodes, and second adjustment electrodes in the sensor element shown in FIG. 3.
Figure 8:
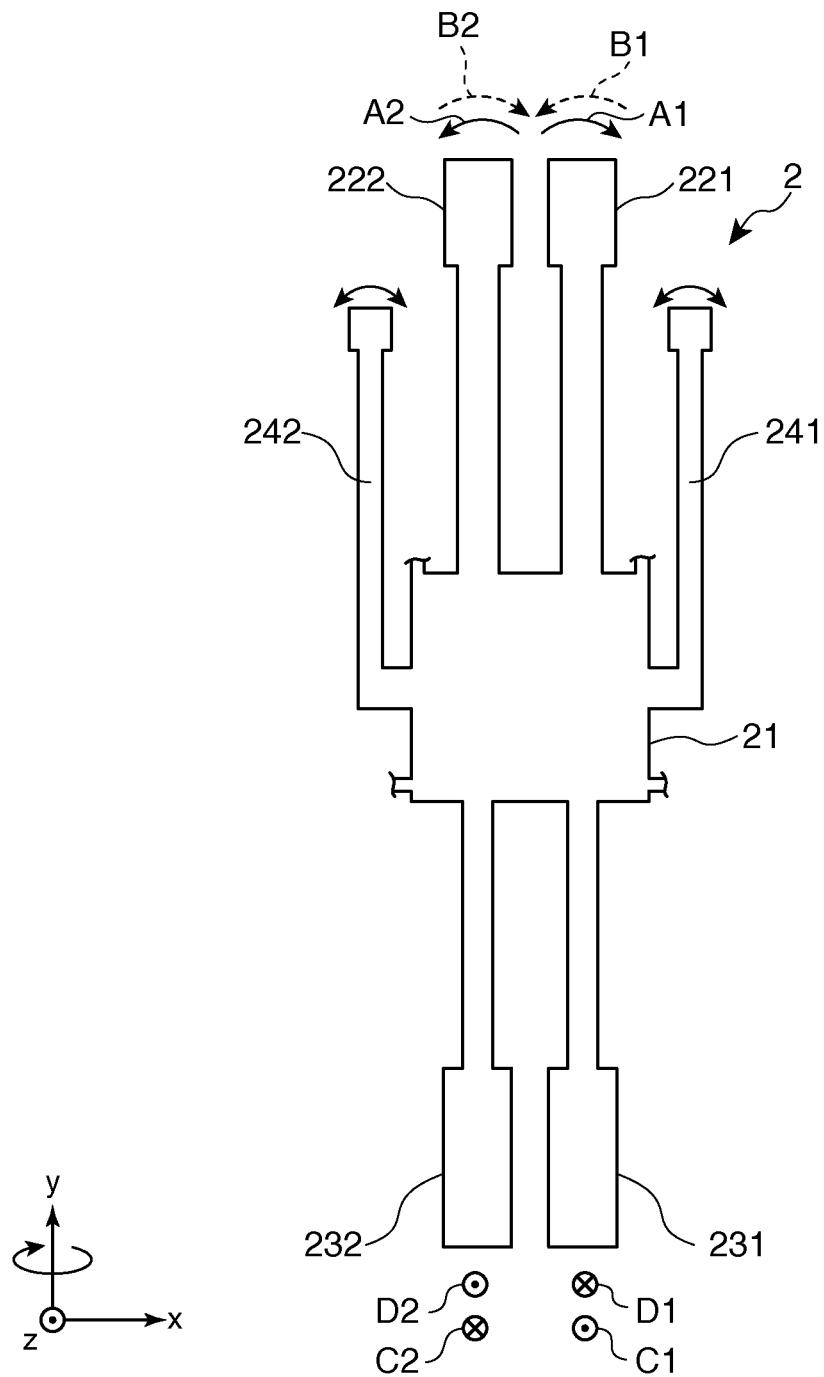
FIG. 8 is a diagram for explanation of an operation of the sensor element shown in FIG. 3.
Figure 9A:
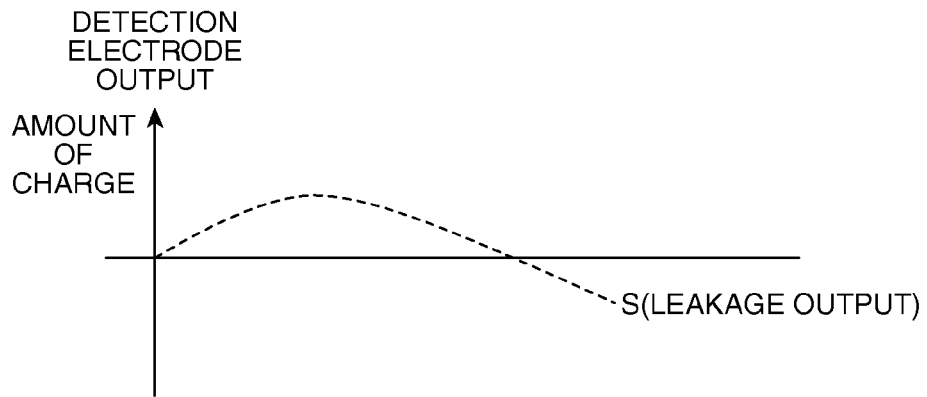
FIG. 9A shows a leakage output of the detection electrode shown in FIGS. 5A and 5B.
Figure 9B:
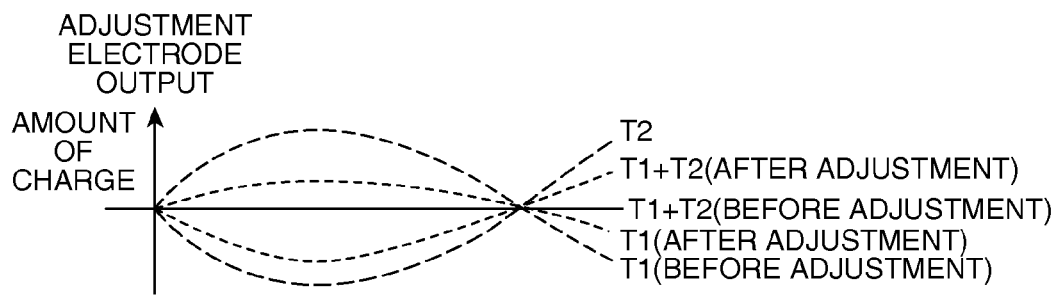
FIG. 9B shows outputs of the adjustment electrodes shown in FIGS. 6A, 6B, and 7.

FIG. 1 is a schematic sectional view showing a general configuration of a sensor device (electronic device) according to the first embodiment of the invention, FIG. 2 is a plan view of the sensor device shown in FIG. 1, FIG. 3 is a plan view showing a sensor element provided in the sensor device shown in FIG. 1, FIG. 4A is an enlarged plan view showing a drive vibrating arm of the sensor element shown in FIG. 3, FIG. 4B is a sectional view of the drive vibrating arm shown in FIG. 4A, FIG. 5A is an enlarged plan view showing a detection vibrating arm of the sensor element shown in FIG. 3, FIG. 5B is a sectional view of the detection vibrating arm shown in FIG. 5A, FIG. 6A is an enlarged plan view showing an adjustment vibrating arm of the sensor element shown in FIG. 3, FIG. 6B is a sectional view of the adjustment vibrating arm shown in FIG. 6A, FIG. 7 shows a connection condition of detection electrodes, first adjustment electrodes, and second adjustment electrodes in the sensor element shown in FIG. 3, FIG. 8 is a diagram for explanation of an operation of the sensor element shown in FIG. 3, FIG. 9A shows a leakage output of the detection electrode shown in FIGS. 5A and 5B, and FIG. 9B shows outputs of the adjustment electrodes shown in FIGS. 6A, 6B, and 7.

Note that, hereinafter, for convenience of explanation, in FIGS. 1 to 7, an x-axis, a y-axis, and a z-axis are shown as three axes orthogonal to one another, and the direction in parallel to the x-axis is referred to as "x-axis direction", the direction in parallel to the y-axis is referred to as "y-axis direction", and the direction in parallel to the z-axis is referred to as "z-axis direction". Further, the +z-axis side is also referred to as "up" and the −z-axis side is also referred to as "down".

Sensor Device

A sensor device 1 shown in FIGS. 1 and 2 is a gyro sensor that detects an angular velocity as a physical quantity.

The sensor device 1 may be used for camera shake correction of an imaging apparatus, and position detection, position control, or the like for a vehicle in mobile navigation system using GPS (Global Positioning System) satellite signals, etc., for example.

The sensor device 1 has a sensor element 2, an IC chip 3, and a package 4 containing the sensor element 2 and the IC chip 3 as shown in FIGS. 1 and 2.

As below, the respective parts forming the sensor device 1 will be sequentially explained.

Sensor Element 2

The sensor element 2 is a gyro sensor element that detects an angular velocity around one axis.

As shown in FIG. 3, the sensor element 2 has a base part 21, a pair of drive vibrating arms 221, 222, a pair of detection vibrating arms 231, 232, a pair of adjustment vibrating arms (vibrating arms) 241, 242, a support part 25, four connection parts 261, 262, 263, 264, groups of drive electrodes 51, 52, groups of detection electrodes 53, 54, and groups of adjustment electrodes 55, 56.

In the embodiment, the base part 21, the pair of drive vibrating arms 221, 222, the pair of detection vibrating arms 231, 232, the pair of adjustment vibrating arms 241, 242, the support part 25, and the four connection parts 261, 262, 263, 264 are integrally formed using a piezoelectric material. As the piezoelectric material, not limited but crystal is preferably used. Thereby, the characteristics of the sensor element 2 may be made advantageous.

The crystal has an X-axis (electrical axis), a Y-axis (mechanical axis), and a Z-axis (optical axis) orthogonal to one another. The base part 21, the pair of drive vibrating arms 221, 222, the pair of detection vibrating arms 231, 232, the pair of adjustment vibrating arms 241, 242, the support part 25, and the four connection parts 261, 262, 263, 264 may be formed by etching processing of a substrate of crystal with the Z-axis along the thickness direction and a plate surface in parallel to the X-axis and the Y-axis, for example. The thickness of the substrate is appropriately set in response to the oscillation frequency (resonance frequency) of the sensor element 2, the external size, the workability, etc. Note that, as below, the case where the base part 21, the pair of drive vibrating arms 221, 222, the pair of detection vibrating arms 231, 232, the pair of adjustment vibrating arms 241, 242, the support part 25, and the four connection parts 261, 262, 263, 264 are integrally formed using crystal will be explained as an example.

The base part 21 is supported by the support part 25 via the four connection parts 261, 262, 263, 264. The four connection parts 261, 262, 263, 264 respectively have longitudinal shapes with one ends connected to the base part 21 and the other ends connected to the support part 25.

The drive vibrating arms 221, 222 respectively extend from the base part 21 in the y-axis direction (+y direction). Further, the drive vibrating arms 221, 222 respectively extend along the Y-axis of the crystal. Furthermore, the cross sections of the drive vibrating arms 221, 222 respectively have rectangular shapes with pairs of sides in parallel to the x-axis and pairs of sides in parallel to the z-axis.

The drive vibrating arm 221 is provided with the group of drive electrodes 51, and similarly, the drive vibrating arm 222 is provided with the group of drive electrodes 52.

As below, the group of drive electrodes 51 will be representatively explained. Note that the group of drive electrodes 52 are the same as the group of drive electrodes 51, and thus, their explanation will be omitted.

As shown in FIGS. 4A and 4B, the group of drive electrodes 51 include a drive electrode 511 provided on the top surface of the drive vibrating arm 221, a drive electrode 512 provided on the bottom surface of the drive vibrating arm 221, a drive electrode 513 provided on one side surface (on the left in FIGS. 4A and 4B) of the drive vibrating arm 221, and a drive electrode 514 provided on the other side surface (on the right in FIGS. 4A and 4B) of the drive vibrating arm 221.

The drive electrode 511 and the drive electrode 512 are electrically connected to each other via a wire (not shown) at the same potential. Further, the drive electrode 513 and the drive electrode 514 are electrically connected to each other via a wire (not shown) at the same potential. The drive electrodes 511, 512 are electrically connected to a terminal 57a provided in the support part 25 shown in FIG. 3 via wires (not shown). Further, the drive electrodes 513, 514 are electrically connected to a terminal 57b provided in the support part 25 shown in FIG. 3 via wires (not shown).

The detection vibrating arms 231, 232 respectively extend from the base part 21 in the y-axis direction (−y direction). Further, the detection vibrating arms 231, 232 respectively extend along the Y-axis of the crystal. Furthermore, the cross sections of the detection vibrating arms 231, 232 respectively have rectangular shapes with pairs of sides in parallel to the x-axis and pairs of sides in parallel to the z-axis.

The detection vibrating arms 231, 232 vibrate in response to physical quantities applied to the drive vibrating arms 221, 222, respectively.

Further, the detection vibrating arm 231 is provided with the group of detection electrodes 53, and similarly, the detection vibrating arm 232 is provided with the group of detection electrodes 54. By providing the groups of detection electrodes 53, 54 on the detection vibrating arms 231, 232 that have been provided separately from the drive vibrating arms 221, 222 as described above, the electrode areas of the detection electrodes of the groups of detection electrodes 53, 54 (areas of the parts that function as electrodes) may be increased. Accordingly, the detection sensitivity of the sensor element 2 may be improved.

As below, the group of detection electrodes 53 will be representatively explained. Note that the group of detection electrodes 54 are the same as the group of detection electrodes 53, and thus, their explanation will be omitted.

As shown in FIGS. 5A and 5B, the group of detection electrodes 53 include detection electrodes 531, 532 provided on the top surface of the detection vibrating arm 231 and detection electrodes 533, 534 provided on the bottom surface of the detection vibrating arm 231. Here, the detection electrodes 531, 533 are respectively provided on one side (on the left side in FIGS. 5A and 5B) in the width direction of the detection vibrating arm 231, and the detection electrodes 532, 534 are respectively provided on the other side (on the right side in FIGS. 5A and 5B) in the width direction of the detection vibrating arm 231.

The detection electrode 531 and the detection electrode 534 are electrically connected to each other via a wire (not shown) at the same potential. Further, the detection electrode 532 and the detection electrode 533 are electrically connected to each other via a wire (not shown) at the same potential. The detection electrodes 531, 534 are electrically connected to a terminal 57c provided in the support part 25 shown in FIG. 3 via wires (not shown). Further, the detection electrodes 532, 533 are electrically connected to a terminal 57e provided in the support part 25 shown in FIG. 3 via wires (not shown). Note that the group of detection electrodes 54 are electrically connected to terminals 57d, 57f provided in the support part 25 shown in FIG. 3 via wires (not shown).

The adjustment vibrating arms 241, 242 respectively extend from the base part 21 in the y-axis direction (+y direction).

In the embodiment, a pair of arm parts 211, 212 extend along the x-axis direction on both ends of the base part 21 in the x-axis direction, and the adjustment vibrating arm 241 extends from the tip end of one arm part 211 and the adjustment vibrating arm 242 extends from the tip end of the other arm part 212. Thereby, the adjustment vibrating arms 241, 242 may be efficiently vibrated with drive vibrations of the drive vibrating arms 221, 222.

Further, the adjustment vibrating arms 241, 242 respectively extend along the Y-axis of the crystal. Furthermore, the cross sections of the adjustment vibrating arms 241, 242 respectively have rectangular shapes with pairs of sides in parallel to the x-axis and pairs of sides in parallel to the z-axis. That is, the adjustment vibrating arms 241, 242 each have a first surface (upper surface), a second surface (lower surface) opposite to the first surface, and a pair of side surfaces connecting the first surface and the second surface.

The adjustment vibrating arms 241, 242 are provided in parallel to the above described drive vibrating arms 221, 222. That is, the drive vibrating arms 221, 222 and the adjustment vibrating arms 241, 242 extend in directions in parallel to each other. Thereby, in the case where the drive vibrating arms 221, 222, the adjustment vibrating arms 241, 242, etc. are formed using crystal, the drive vibrating arms 221, 222 and the adjustment vibrating arms 241, 242 are formed to respectively extend along the Y-axis of the crystal, and the drive vibrating arms 221, 222 may be efficiently vibrated and a potential difference may be generated between the pair of adjustment electrodes of the groups of adjustment electrodes 55, 56 in a simple configuration.

Further, a mass part 2411 (weight part) formed wider than the base end part is provided in the tip end part of the adjustment vibrating arm 241 (see FIG. 6A). Similarly, a mass part (weight part) formed wider than the base end part is provided in the tip end part of the adjustment vibrating arm 242. Thereby, the masses of the tip end parts of the adjustment vibrating arms 241, 242 may be increased, the natural frequencies (resonance frequencies) of the adjustment vibrating arms 241, 242 may be reduced, and the lengths of the adjustment vibrating arms 241, 242 may be suppressed.

Furthermore, a mass adjustment film 2412 (mass adjustment part) part or all of which may be removed according to need is provided in the tip end part (mass part 2411) of the adjustment vibrating arm 241 (see FIG. 6A). Similarly, a mass adjustment film (mass adjustment part) part or all of which may be removed according to need is provided in the tip end part of the adjustment vibrating arm 242.

Thereby, the resonance frequencies of the adjustment vibrating arms 241, 242 may be respectively adjusted. Accordingly, the resonance frequencies of the adjustment vibrating arms 241, 242 may be made closer to the frequencies of the drive vibrations of the drive vibrating arms 221, 222, respectively, the amplitudes of the vibrations of the adjustment vibrating arms 241, 242 with the drive vibrations of the drive vibrating arms 221, 222 are increased, and thereby, the potential difference between the pair of adjustment electrodes of the groups of adjustment electrodes 55, 56 may be increased. As a result, the adjustment range of the sensor output, which will be described later, may be made wider.

As a constituent material of the mass adjustment film 2412 is not particularly limited, however, it is preferable to use a material having larger specific gravity than that of the constituent material of the adjustment vibrating arm 241 in view of increase in the adjustment range of the mass of the adjustment vibrating arm 241, and it is preferable to use the same constituent material as that of the group of adjustment electrodes 55 etc. (metal material) in view of simplification of the manufacturing process by collectively forming the film with the group of adjustment electrodes 55 etc.

Further, the adjustment vibrating arm 241 is provided with the group of adjustment electrodes 55, and similarly, the adjustment vibrating arm 242 is provided with the group of adjustment electrodes 56.

As below, the group of adjustment electrodes 55 will be representatively explained. Note that the group of adjustment electrodes 56 are the same as the group of adjustment electrodes 55, and thus, their explanation will be omitted.

As shown in FIGS. 6A and 6B, the group of adjustment electrodes 55 include adjustment electrodes 551, 552, 553 as first adjustment electrodes (first electrodes) and adjustment electrodes 554, 555, 556 as second adjustment electrodes (second electrodes).

Specifically, the adjustment electrode (first principal surface electrode) 551 is provided on one side (on the left in FIGS. 6A and 6B) in the width direction of the top surface of the adjustment vibrating arm 241, and the adjustment electrode (second principal surface electrode) 554 is provided on the other side (on the right in FIGS. 6A and 6B) in the width direction of the top surface of the adjustment vibrating arm 241.

In the embodiment, the adjustment electrodes 551, 554 are provided to respectively extend in the extension direction of the adjustment vibrating arm 241 in parallel to each other. Thereby, in the adjustment of the sensor output, which will be described later, in both cases where the sensor output is larger and smaller than a desired reference value when no physical quantity is applied to the sensor element 2, the adjustment range of the sensor output may be made larger.

Further, the adjustment electrode (first principal surface electrode) 552 is provided on one side (on the left in FIGS. 6A and 6B) in the width direction of the bottom surface of the adjustment vibrating arm 241, and the adjustment electrode (second principal surface electrode) 555 is provided on the other side (on the right in FIGS. 6A and 6B) in the width direction of the bottom surface of the adjustment vibrating arm 241.

In the embodiment, the adjustment electrodes 552, 555 are provided to respectively extend in the extension direction of the adjustment vibrating arm 241 in parallel to each other.

Furthermore, the adjustment electrode 552 is formed to overlap with the adjustment electrode 551 in the plan view. That is, the adjustment electrodes 551 and the adjustment electrode 552 are formed to have the same outer shape in the plan view. According to thus formed adjustment electrode 551 and the adjustment electrode 552, when part of the adjustment electrode 551 is removed, the part of the adjustment electrode 552 corresponding to the removed part may be removed at the same time, as will be described. Note that, similarly, the adjustment electrode 554 and the adjustment electrode 555 are formed to have the same outer shape in the plan view.

In addition, the adjustment electrode 553 (first side surface electrode) is provided on one side surface (on the left in FIGS. 6A and 6B) of the adjustment vibrating arm 241, and the adjustment electrode 556 (second side surface electrode) is provided on the other side surface (on the right in FIGS. 6A and 6B) of the adjustment vibrating arm 241.

Here, the adjustment electrode 553 (first adjustment electrode) functions as a common electrode paired with the adjustment electrode 551 (first adjustment electrode) and paired with the adjustment electrode 552 (first adjustment electrode). Similarly, the adjustment electrode 556 (second adjustment electrode) functions as a common electrode paired with the adjustment electrode 554 (second adjustment electrode) and paired with the adjustment electrode 555 (second adjustment electrode).

Note that the adjustment electrode 553 may be divided at the top surface side and the bottom surface side of the adjustment vibrating arm 241 and formed by two electrodes separately paired with respect to the adjustment electrodes 551, 552. Similarly, the adjustment electrode 556 may be divided at the top surface side and the bottom surface side of the adjustment vibrating arm 241 and formed by two electrodes separately paired with respect to the adjustment electrodes 554, 555.

The adjustment electrode 551 and the adjustment electrode 552 are electrically connected to each other via a wire (not shown) at the same potential. Further, the adjustment electrode 554 and the adjustment electrode 555 are electrically connected to each other via a wire (not shown) at the same potential. The adjustment electrodes 551, 552, 556 are electrically connected to the terminal 57c provided in the support part 25 shown in FIG. 3 via wires (not shown) with the above described detection electrodes 531, 534. Further, the adjustment electrodes 553, 554, 555 are electrically connected to the terminal 57e provided in the support part 25 shown in FIG. 3 via wires (not shown) with the above described detection electrodes 532, 533. Note that the group of adjustment electrodes 56 are electrically connected to the terminals 57d, 57f provided in the support part 25 shown in FIG. 3 via wires (not shown) with the group of detection electrodes 54.

As described above, the adjustment electrodes 551 to 553 and the adjustment electrodes 554 to 556 are electrically connected to the detection electrodes 531 to 534 to have opposite polarities.

In the sensor element 2 having the adjustment electrodes 551 to 556, as shown in FIG. 7, a value obtained by adding the charge generated in the adjustment electrodes 551, 552 and the adjustment electrode 556 to the charge generated in the detection electrodes 531, 534 may be output from the terminal 57c as a sensor output, and a value obtained by adding the charge generated in the adjustment electrode 553 and the adjustment electrodes 554, 555 to the charge generated in the detection electrodes 532, 533 may be output from the terminal 57e as a sensor output (hereinafter, also simply referred to as "sensor output").

The adjustment electrodes 551, 552 and the adjustment electrode 556 are connected with opposite polarities and cancel out the generated charge by each other. Further, the adjustment electrode 553 and the adjustment electrodes 554, 555 are connected with opposite polarities and cancel out the generated charge by each other.

By removing part or all of the adjustment electrodes 551, 552, the amount of charge generated in the adjustment electrodes 551, 552 and the adjustment electrode 553 may be reduced. Thereby, a difference is produced between the amount of charge generated in the adjustment electrodes 551, 552 and the adjustment electrode 553 and the amount of charge generated in the adjustment electrode 556 and the adjustment electrodes 554, 555. The difference in amount of charge is used as a signal for adjustment of the sensor output (adjustment signal). Note the polarity of the output adjustment signal is the same as that of the adjustment electrode 556 and the adjustment electrodes 554, 555.

Further, by removing part or all of the adjustment electrodes 554, 555, the amount of charge generated in the adjustment electrodes 554, 555 and the adjustment electrode 556 may be reduced. Thereby, a difference is produced between the amount of charge generated in the adjustment electrodes 554, 555 and the adjustment electrode 556 and the amount of charge generated in the adjustment electrodes 551, 552 and the adjustment electrode 553. The difference in amount of charge is used as a signal for adjustment of the sensor output (adjustment signal). Note the polarity of the output adjustment signal is the same as that of the adjustment electrodes 551, 552 and the adjustment electrode 553.

Specifically, for example, the sensor output may be adjusted (corrected) so that the sensor output under the condition that no physical quantity is applied to the sensor element 2 may be zero (hereinafter, also referred to as "zero point output").

Particularly, the adjustment electrodes 551 to 553 and the adjustment electrodes 554 to 556 are electrically connected to the detection electrodes 531 to 534 to have opposite polarities. Thus, in either case where the sensor output when no physical quantity is applied to the sensor element 2 is larger or smaller than the desired reference value, one or some adjustment electrodes of the adjustment electrodes 551, 552 and the adjustment electrodes 554, 555 are selected and part or all of them are removed, and thereby, the sensor output when no physical quantity is applied to the sensor element 2 may be adjusted to the desired reference value.

In the sensor element 2 having the above described configuration, a drive signal is applied between the terminal 57a and the terminal 57b, and thereby, as shown in FIG. 8, the drive vibrating arm 221 and the drive vibrating arm 222 flexurally vibrate (drive-vibrate) close to or away from each other. That is, the state in which the drive vibrating arm 221 is flexed in a direction of an arrow A1 shown in FIG. 8 and the drive vibrating arm 222 is flexed in a direction of an arrow A2 shown in FIG. 8 and the state in which the drive vibrating arm 221 is flexed in a direction of an arrow B1 shown in FIG. 8 and the drive vibrating arm 222 is flexed in a direction of an arrow B2 shown in FIG. 8 are alternately repeated.

When an angular velocity ω around the y-axis is applied during drive vibrations of the drive vibrating arms 221, 222, the drive vibrating arms 221, 222 flexurally vibrate along the z-axis in opposite directions to each other by the Coriolis force. With the vibrations, the detection vibrating arms 231, 232 flexurally vibrate (detection-vibrate) along the z-axis in opposite directions to each other. That is, the state in which the detection vibrating arm 231 is flexed in a direction of an arrow C1 shown in FIG. 8 and the detection vibrating arm 232 is flexed in a direction of an arrow C2 shown in FIG. 8 and the state in which the detection vibrating arm 231 is flexed in a direction of an arrow D1 shown in FIG. 8 and the detection vibrating arm 232 is flexed in a direction of an arrow D2 shown in FIG. 8 are alternately repeated.

By detecting the charge generated in the groups of detection electrodes 53, 54 by the detection vibrations of the detection vibrating arms 231, 232, the angular velocity ω applied to the sensor element 2 may be obtained.

In this regard, the adjustment vibrating arms 241, 242 also flexurally vibrate in directions close to or away from each other with the drive vibrations of the drive vibrating arms 221, 222.

In the sensor element 2, in the case where the cross section shapes of the drive vibrating arms 221, 222 are not as designed due to variations at manufacturing, for example, under the condition that no physical quantity is applied to the sensor element 2 and the drive vibrating arms 221, 224 are vibrated by energization, charge to be a leakage output S is generated in the detection electrodes 531, 534 and the detection electrodes 532, 533 as shown in FIG. 9A.

Further, in the sensor element 2, regardless of whether or not the physical quantity is applied to the sensor element 2, the charge to be an adjustment output T1 is generated in the adjustment electrodes 551, 552 and the adjustment electrode 553 and the charge to be an adjustment output T2 is generated in the adjustment electrodes 554, 555 and the adjustment electrode 556 with the drive vibrations of the drive vibrating arms 221, 224 as shown in FIG. 9B.

The adjustment output T1 and the adjustment output T2 have opposite polarities to each other (at opposite phases). Further, the sum T1+T2 of the adjustment output T1 and the adjustment output T2 cancels out the leakage output S, and thereby, the zero point output of the sensor element 2 may be made zero.

Accordingly, the sensor output is adjusted by removing part or all of the adjustment electrodes 551, 552 or the adjustment electrodes 554, 555 so that the sum T1+T2 of the adjustment output T1 and the adjustment output T2 may cancel out the leakage output S.

That is, a manufacturing method of the sensor element 1 has a charge adjustment step of adjusting the amount of charge generated in the adjustment electrodes 551, 552 or the adjustment electrodes 554, 555 by removing part or all of the adjustment electrodes 551, 552 or the adjustment electrodes 554, 555.

Here, the charge adjustment step (a characteristics adjustment method of the sensor element 2) will be explained by taking a specific example. Note that, as below, the characteristics adjustment for the detection vibrating arm 231 and the adjustment vibrating arms 241, 243 will be representatively explained, and the characteristics adjustment for the detection vibrating arm 232 and the adjustment vibrating arms 242, 244 is the same.

Figure 10:
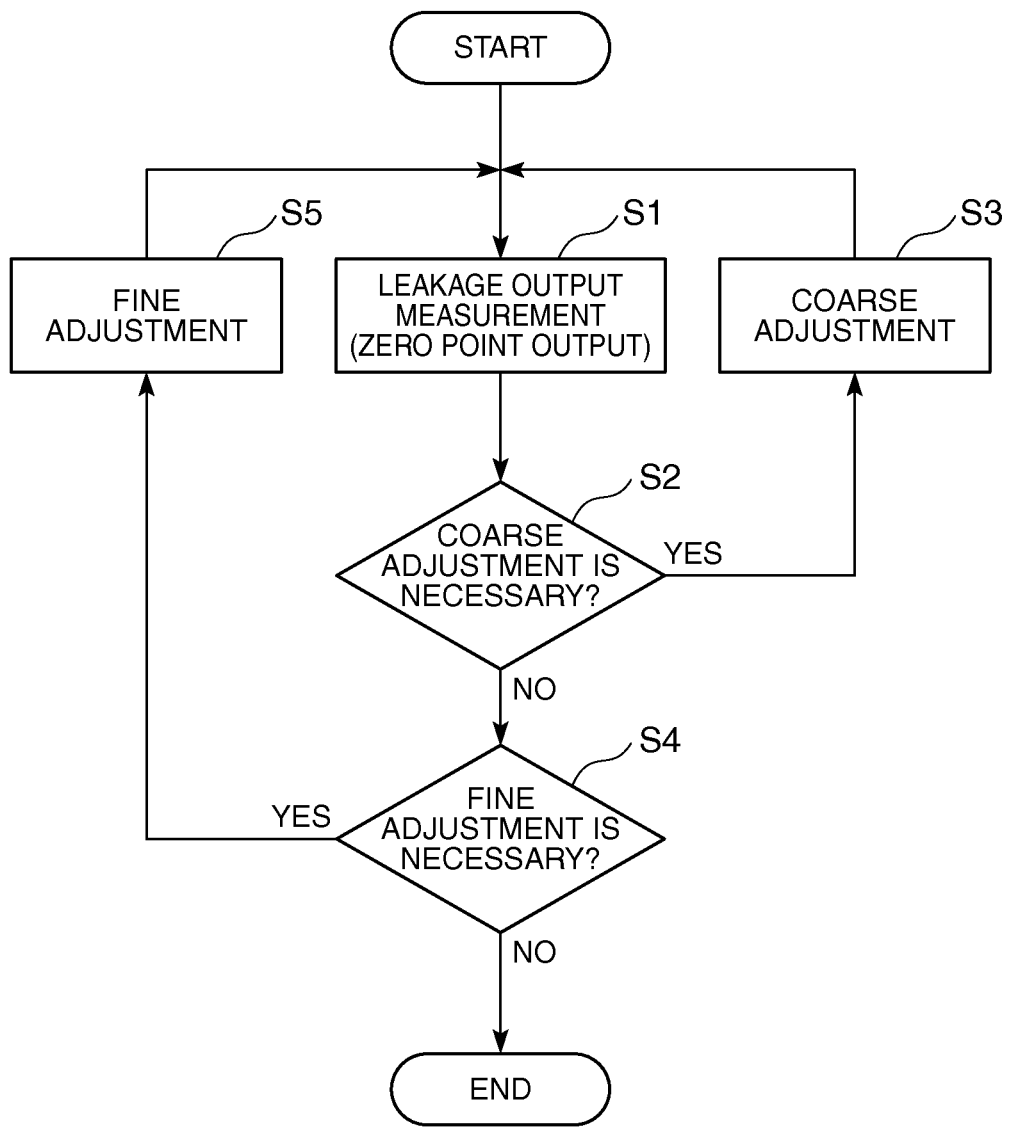
FIG. 10 is a flowchart showing an example of a characteristics adjustment method of the sensor element shown in FIG. 3.

FIG. 10 is a flowchart showing an example of the characteristics adjustment method of the sensor element shown in FIG. 3, and FIGS. 11A to 11C are diagrams for explanation of an example of the characteristics adjustment method of the sensor element shown in FIG. 3.

In the characteristics adjustment method of the sensor element 2, the above described sensor element 2 is prepared, and the characteristics of the sensor element 2 are adjusted by removing part or all of the adjustment electrodes 551, 552 or the adjustment electrodes 554, 555 of the sensor element 2.

As described above, in the case where the leakage output S is generated as shown in FIG. 9A and the adjustment outputs T1, T2 are generated as shown in FIG. 9B, the characteristics of the sensor element 2 are adjusted by selecting the adjustment electrodes 551, 552 from the adjustment electrodes 551, 552 and the adjustment electrodes 554, 555 and removing part of them.

Note that, in the case where the leakage output S has opposite polarity (at the opposite phase) to that shown in FIG. 9A, the characteristics of the sensor element 2 may be adjusted by selecting the adjustment electrodes 554, 555 and removing part of them. Further, whether to select the adjustment electrodes 551, 552 or the adjustment electrodes 554, 555 as the adjustment electrodes part of which is to be removed may be determined according to a measurement result at step S1, which will be described later.

As below, the case where the leakage output S is generated as shown in FIG. 9A and the adjustment outputs T1, T2 are generated as shown in FIG. 9B as described above will be representatively explained.

In this case, specifically, the characteristics of the sensor element 2 are adjusted by removing part or all of the adjustment electrode 551. Note that the adjustment electrode 551 will be representatively explained as below though part of the adjustment electrode 552 is removed like the adjustment electrode 551.

In the characteristics adjustment, under the condition that the drive vibrating arms 221, 222 are energized and vibrated, the amount of charge generated at the terminal 57c is measured and the above described cutting is performed based on the measurement result.

More specifically, as shown in FIG. 10, first, the leakage output (zero point output) is measured (step S1).

Then, whether or not coarse adjustment is necessary is determined based on the measurement result (step S2). Specifically, when the zero point output is equal to or more than a first set value (for example, about 100 pA), the determination such that the coarse adjustment is necessary is made, and, when the zero point output is less than the first set value, the determination such that the coarse adjustment is not necessary is made.

Figures 11A, 11B, 11C:
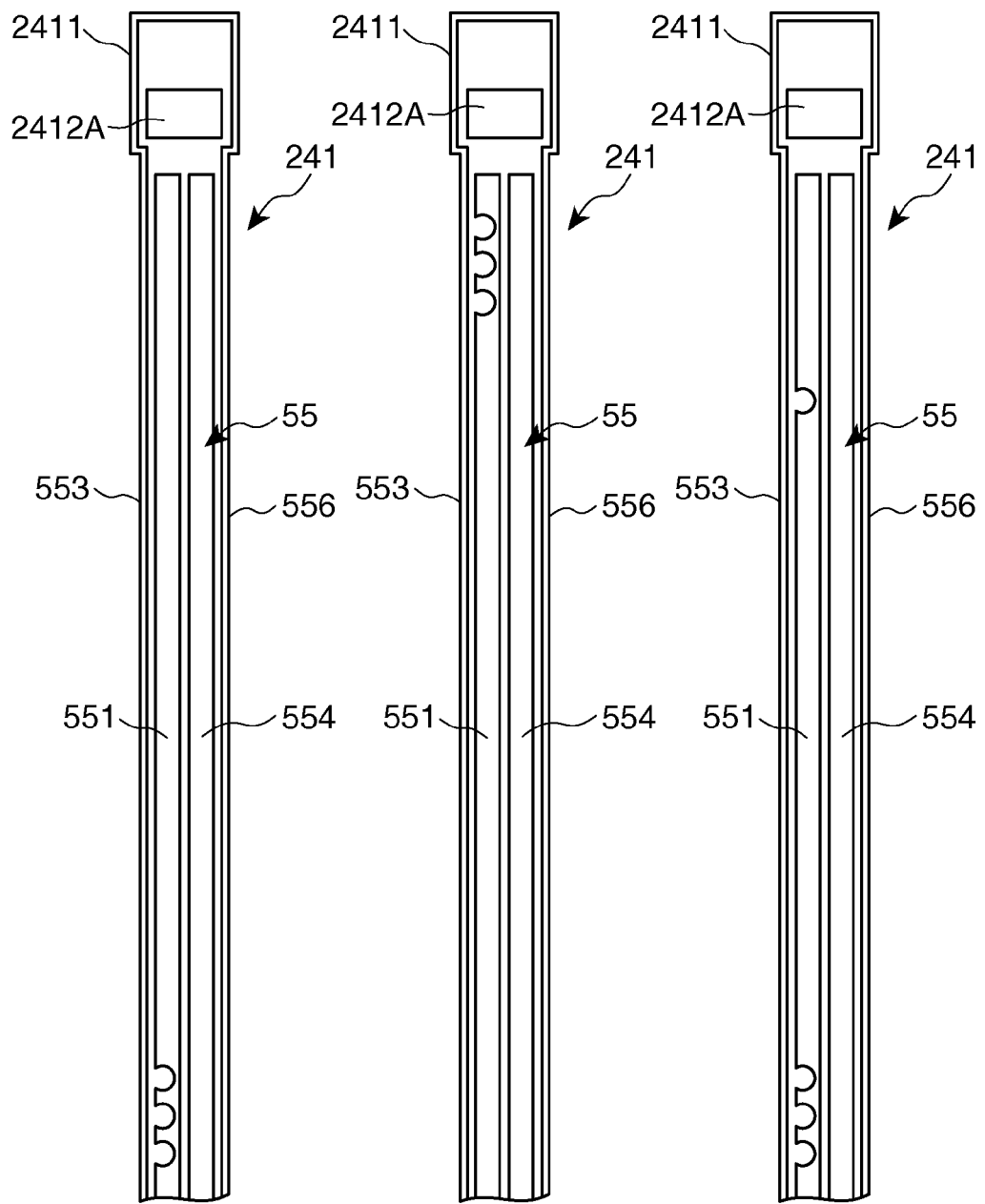
FIGS. 11A to 11C are diagrams for explanation of an example of the characteristics adjustment method of the sensor element shown in FIG. 3.

When the determination such that the coarse adjustment is necessary has been made, the coarse adjustment is performed (step S3). Specifically, for example, as shown in FIG. 11A, a part having a predetermined area in a predetermined location at the base end side of the adjustment electrode 551 is removed.

Here, with respect to each location and area of the adjustment electrode 551 to be removed, the amounts of reduction of the adjustment output T by the removal are obtained by experiments, calculations, or the like in advance, and thereby, the location and area of the adjustment electrode 551 to be removed may be appropriately determined based on the zero point output measured at step S1.

The removal of the adjustment electrode 551 may be performed using laser, for example, but not limited thereto.

Further, if the determination such that the coarse adjustment is necessary has been made, the resonance frequency of the adjustment vibrating arm 241 is adjusted by removing part or all of the mass adjustment film 2412 according to need. That is, according to need, before the charge adjustment step, the method has a step of measuring the charge generated in the detection electrodes 531 to 534 under the condition that the drive vibrating arms 221, 222 are energized and vibrated and a step of adjusting the resonance frequencies of the adjustment vibrating arms 241, 242 based on the measurement result. Thereby, the adjustment range of the sensor output may be made larger. Note that, in FIG. 11A, a mass adjustment film 2412A formed by removing part of the mass adjustment film 2412 is shown.

The removal of part or all of the mass adjustment film 2412 may be performed using laser, for example, not particularly limited thereto.

After the coarse adjustment, the process returns to step S1 again, and the leakage output (zero point output) is measured. Then, the measurement of the zero point output and the coarse adjustment are alternately repeated until the zero point output becomes less than the first set value.

On the other hand, if the determination such that the coarse adjustment is not necessary has been made, whether or not fine adjustment is necessary is determined based on the measurement result at step S1 (step S4). Specifically, when the zero point output is equal to or more than a second set value (for example, about 10 pA) smaller than the first set value, determination such that the fine adjustment is necessary is made, and, when the second set value is less than the second set value, determination such that the fine adjustment is not necessary is made.

If the determination such that the fine adjustment is necessary is made, the fine adjustment is performed (step S5). Specifically, for example, as shown in FIG. 11B or 11C, apart having a predetermined area in a predetermined location at the tip end side of the adjustment electrode 551 is removed. Note that FIG. 11B shows the case where the coarse adjustment is not performed, but the fine adjustment is performed, and FIG. 11C shows the case where the coarse adjustment is performed, and then, the fine adjustment is performed. Further, FIGS. 11B and 11C show the cases where part of the adjustment electrode 551 is removed so that part in the width direction of the adjustment electrode 551 may be left, however, according to need, the entire part in the width direction of the adjustment electrode 551 may be removed, i.e., the intermediate part in the extension direction of the adjustment electrode 551 may be cut. Thereby, the function of the part nearer the end side than the cut part of the adjustment electrode 551 may be lost by one cutting.

Here, like the coarse adjustment, with respect to each location and area of the adjustment electrode 551 to be removed, the amounts of reduction of the adjustment output T by the removal are obtained by experiments, calculations, or the like in advance, and thereby, the location and area of the adjustment electrode 551 to be removed may be appropriately determined based on the zero point output measured at step S1.

After the fine adjustment, the process returns to step S1 again, and the leakage output (zero point output) is measured. Then, the measurement of the zero point output and the fine adjustment are alternately repeated until the zero point output becomes less than the second set value.

On the other hand, if the determination such that the fine adjustment is not necessary is made, the characteristics adjustment of the sensor element 2 is ended.

According to the above described characteristics adjustment method of the sensor element 2, the above described coarse adjustment and fine adjustment may be arbitrarily selected and performed according to need, and thus, advantageous detection sensitivity may be exerted simply and reliably.

IC Chip 3

The IC chip 3 shown in FIGS. 1 and 2 is an electronic component having a function of driving the above described sensor element 2 and a function of detecting the output (sensor output) from the sensor element 2.

The IC chip 3 includes a driver circuit (not shown) that drives the sensor element 2 and a detector circuit (not shown) that detects the output from the sensor element 2.

Further, plural connection terminals 31 are provided in the IC chip 3.

Package 4

As shown in FIGS. 1 and 2, the package 4 includes a base member 41 (base) having a recess part opening upward and a lid member 42 (lid) provided to cover the recess part of the base member 41. Thereby, an internal space for housing the sensor element 2 and the IC chip 3 is formed between the base member 41 and the lid member 42.

The base member 41 includes a flat plate body 411 (plate part) and a frame body 412 (frame part) bonded to the outer peripheral part of the top surface of the plate body 411.

The base member 41 is formed using aluminum oxide sintered compact, crystal, glass, or the like, for example.

As shown in FIG. 1, to the top surface of the base member 41 (the surface at the side covered by the lid member 42), the above described support part 25 of the sensor element 2 is bonded using a bonding member 81 such as an adhesive agent including an epoxy resin, acrylic resin, or the like, for example. Thereby, the sensor element 2 is supported and fixed with respect to the base member 41.

Further, to the top surface of the base member 41, the above described IC chip 3 is bonded using a bonding member 82 such as an adhesive agent including an epoxy resin, acrylic resin, or the like, for example. Thereby, the IC chip 3 is supported and fixed with respect to the base member 41.

Furthermore, as shown in FIGS. 1 and 2, on the top surface of the base member 41, plural internal terminals 71 are provided.

The terminals 57a to 57f of the above described sensor element 2 are electrically connected to the plural internal terminals 71 via wires including bonding wires, for example.

The plural internal terminals 71 are electrically connected to each other via wires (not shown).

Further, the above described connection terminals 31 of the IC chip 3 are electrically connected to the plural internal terminals 71 via wires including bonding wires, for example.

On the other hand, as shown in FIG. 1, on the lower surface of the base member 41 (the bottom surface of the package 4), plural external terminals 73 used when the sensor device 1 is mounted on an apparatus (external apparatus) in which the device is incorporated are provided.

The plural external terminals 73 are electrically connected to the above described internal terminals 71 via internal wires (not shown). Thereby, the IC chip 3 and the external terminals 73 are electrically connected.

The respective internal terminals 71 and the respective external terminals 73 are metal coatings formed by stacking coatings of nickel (Ni), gold (Au), or the like on a metalization layer of tungsten (W) or the like, for example.

The lid member 42 is air-tightly bonded to the base member 41. Thereby, the package 4 is air-tightly sealed.

The lid member 42 is formed using the same material as that of the base member 41 or metal such as kovar, 42 Alloy, or stainless steel, for example.

As a bonding method of the base member 41 and the lid member 42, not particularly limited, but, for example, a bonding method using an adhesive agent including a brazing filler metal, a hardening resin, or the like, a welding method such as seam welding or laser welding may be used.

The bonding is performed under reduced pressure or an inert gas atmosphere, and thereby, the package 4 may be held in the reduced pressure state or the inert gas sealed state.

According to the above described sensor element 2 provided in the sensor device 1 according to the first embodiment, advantageous detection sensitivity may be exerted simply and reliably.

Further, according to the above described sensor device 1 including the sensor element 2, the device has advantageous detection sensitivity at low cost.

Second Embodiment

Next, the second embodiment of the invention will be explained.

Figure 12A:
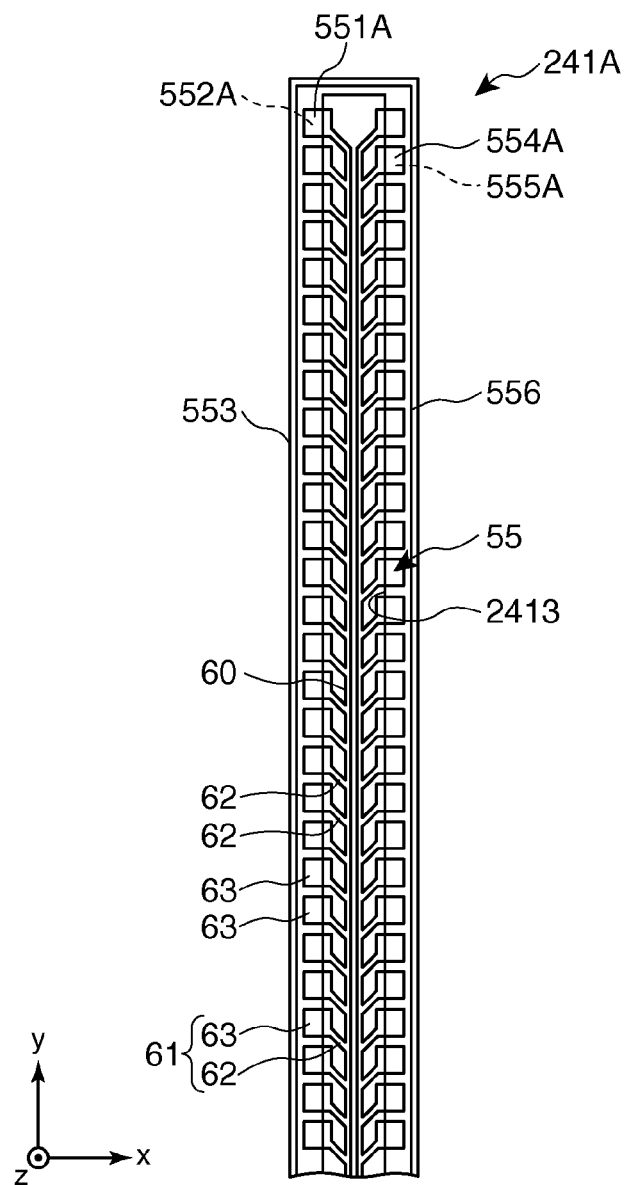
FIGS. 12A and 12B are enlarged plan views showing an adjustment vibrating arm of a sensor element according to a second embodiment of the invention.
Figure 12B:
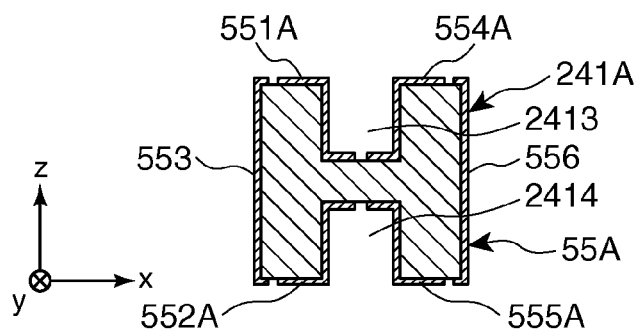
Figures 13A, 13B, 13C:
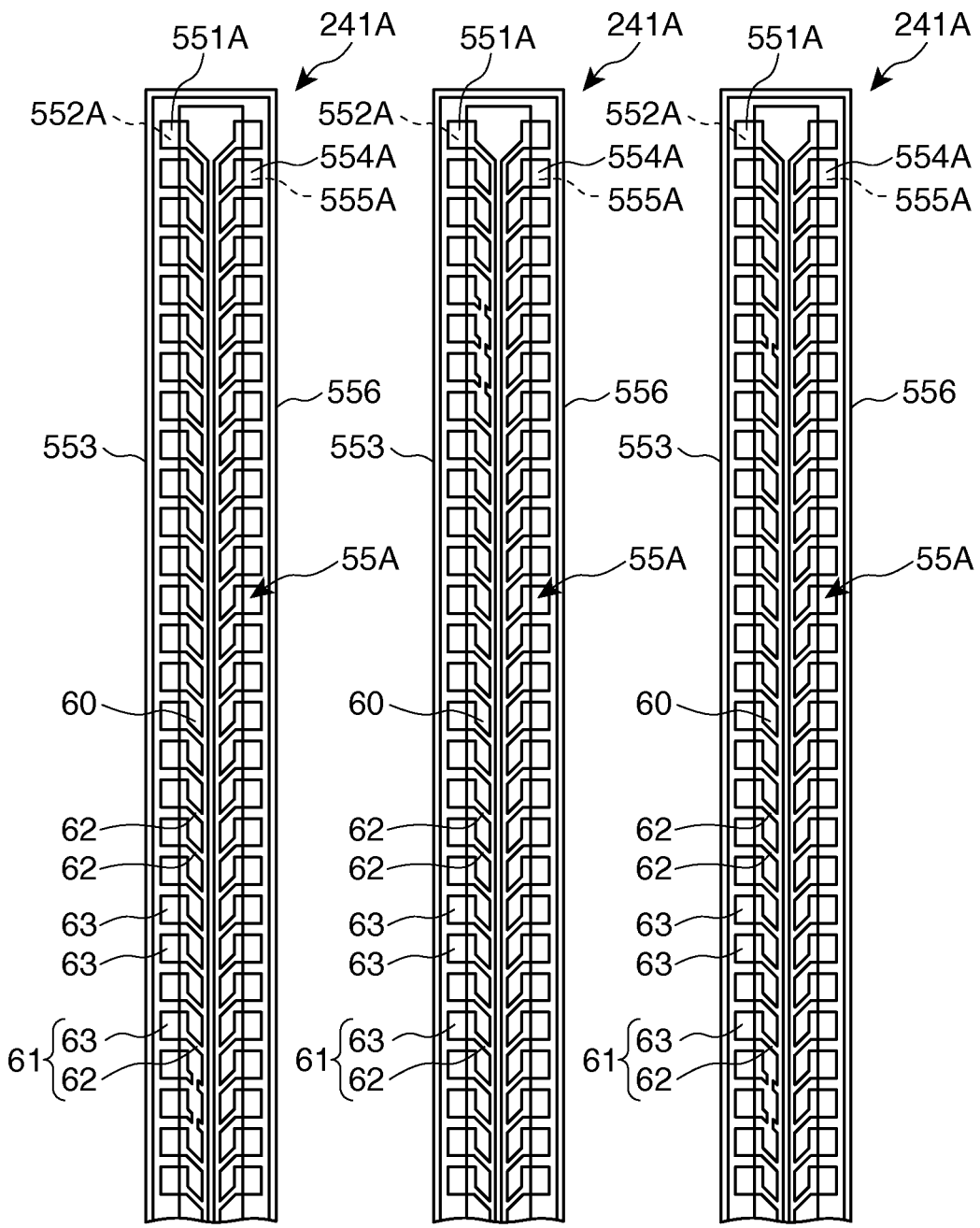
FIGS. 13A to 13C are diagrams for explanation of an example of a characteristics adjustment method of the sensor element shown in FIGS. 12A and 12B.

FIGS. 12A and 12B are enlarged plan views showing an adjustment vibrating arm of a sensor element according to the second embodiment of the invention, and FIGS. 13A to 13C are diagrams for explanation of an example of a characteristics adjustment method of the sensor element shown in FIGS. 12A and 12B.

The sensor element according to the embodiment is the same as the above described sensor element according to the first embodiment except that the wider parts in the tip end parts of the adjustment vibrating arms and the mass adjustment film are omitted and the cross section shapes of the adjustment vibrating arms and the shapes of the first adjustment electrodes and the second adjustment electrodes are different.

Note that, in the following explanation, regarding the sensor element of the second embodiment, the difference from the above described embodiment will be centered for explanation and the explanation of the same items will be omitted. Further, in FIGS. 12A to 13C, the same configuration as that of the above described embodiment has the same signs.

The sensor element of the embodiment has an adjustment vibrating arm 241A shown in FIGS. 12A and 12B. Note that the sensor element has a base part, a pair of drive vibrating arms and a pair of detection vibrating arms (not shown) like that of the above described first embodiment, and further, an adjustment vibrating arm paired with the adjustment vibrating arm 241A extends from the base part.

The cross section of the adjustment vibrating arm 241A has an H-shape. In the center part in the width direction of the top surface of the adjustment vibrating arm 241A, a groove part 2413 along the y-axis direction is formed, and, in the center part in the width direction of the bottom surface of the adjustment vibrating arm 241A, a groove part 2414 along the y-axis direction is formed.

The cross sections of the groove parts 2413, 2414 respectively have rectangular shapes and wall surfaces in parallel to the side surfaces of the adjustment vibrating arm 241A.

A group of adjustment electrodes 55A are provided on the adjustment vibrating arm 241A.

The group of adjustment electrodes 55A include adjustment electrodes 551A, 554A provided on the top surface of the adjustment vibrating arm 241A, adjustment electrodes 552A, 555A provided on the bottom surface of the adjustment vibrating arm 241A, an adjustment electrode 553 provided on one side surface (on the left in FIGS. 12A and 12B) of the adjustment vibrating arm 241A, and an adjustment electrode 554 provided on the other side surface (on the right in FIGS. 12A and 12B) of the adjustment vibrating arm 241A.

Here, the adjustment electrode 551A is provided on one side (on the left in FIGS. 12A and 12B) of the top surface of the adjustment vibrating arm 241A and the adjustment electrode 554A is provided on the other side (on the right in FIGS. 12A and 12B) of the top surface of the adjustment vibrating arm 241A. Further, the adjustment electrode 552A is provided on one side (on the left in FIGS. 12A and 12B) of the bottom surface of the adjustment vibrating arm 241A and the adjustment electrode 555A is provided on the other side (on the right in FIGS. 12A and 12B) of the bottom surface of the adjustment vibrating arm 241A.

Further, the adjustment electrodes 551A and 552A and the adjustment electrodes 554A and 555A are formed to be symmetric with respect to the center axis (the line segment passing through the center and extending in the y-axis direction) of the adjustment vibrating arm 241A.

Note that, though not illustrated, the adjustment electrodes 552A and 555A may have the same shapes as those of the adjustment electrodes 551A and 554A or different shapes from those of the adjustment electrodes 551A and 554A.

As below, the adjustment electrode 551A will be described in detail. Note that the adjustment electrodes 552A, 554A, 555A are the same as the adjustment electrode 551A, and their explanation will be omitted.

The adjustment electrode 551A includes a common part 60 and plural branch parts 61 as shown in FIG. 12A.

The common part 60 is electrically connected to the detection electrode (not shown).

Further, the plural branch parts 61 are branched from the common part 60 and provided in lines along the extension direction of the adjustment vibrating arm 241A.

In the adjustment electrode 551A, the potential difference between the adjustment electrode 551A and the adjustment electrode 553 may be reduced and the sensor output may be adjusted by cutting the intermediate part of at least one branch part 61 of the plural branch parts 61 and the intermediate part of the common part 60.

Particularly, since the plural branch parts 61 are branched from the common part 60, even when an arbitrary branch part 61 is cut, the electrical connection of the other branch parts 61 to the common part 60 may be maintained. That is, the electrode area of the adjustment electrode 551A may be reduced by the amount of the arbitrary branch part 61 of the plural branch parts 61.

In addition, since the plural branch parts 61 are provided in lines along the extension direction of the adjustment vibrating arm 241A, the sensor output may be adjusted simply with high accuracy in response to the locations and the number of branch parts 61 to be cut.

In the embodiment, the common part 60 extends along the extension direction of the adjustment vibrating arm 241A, and the plural branch parts 61 are branched from plural parts different from each other in the longitudinal direction of the common part 60. Thereby, the configuration of the adjustment electrode 551A may be simplified.

In the embodiment, the common part 60 is provided in the center part in the width direction of the adjustment vibrating arm 241A, i.e., on the bottom surface of the groove part 2413 in the plan view (as seen from the z-axis direction) as shown in FIG. 12A. Further, the common part 60 is formed to have a narrower width. Thereby, the intermediate part of the common part 60 may be cut relatively easily.

Each branch part 61 has a narrower part 62 formed to have a narrower width at the common part 60 side and a wider part 63 formed to have a wider width at the opposite side to the common part 60. As described above, since each branch part 61 has the wider part 63, the electrode area of the adjustment electrode 551A before adjustment (before cutting of the intermediate part of the common part 60 or the branch part 61) may be secured larger and the adjustment range of the sensor output may be made wider by cutting of the intermediate part of the common part 60 or the branch part 61. Further, since each branch part 61 has the narrower part 62, the intermediate part of the branch part 61 may be cut relatively easily.

The plural narrower parts 62 are provided in parallel to one another.

The plural branch parts 61 are formed to have equal dimensions to one another. Further, the plural branch parts 61 are arranged with equal pitches in the extension direction of the adjustment vibrating arm 241A, i.e., the y-axis direction.

The respective narrower parts 62 are provided on the bottom surface of the groove part 2413 of the adjustment vibrating arm 241A. Thereby, the respective narrower parts 62 may be easily cut using laser.

Specifically, the respective narrower parts 62 extend in a direction tilted with respect to the extension direction of the adjustment vibrating arm 241A. Thereby, when the narrower parts 62 are cut using laser, the narrower parts 62 may be cut by scanning of the laser in the x-axis direction or the y-axis direction. Accordingly, the intermediate part of the branch part 61 may be easily cut.

Specifically, the parts of the respective branch parts 61 are provided on the wall surfaces of the groove part 2413 (the wall surfaces in parallel to the side surfaces of the adjustment vibrating arm 241A). Thereby, the charge output from the adjustment electrode 551A and the adjustment electrode 553 may be increased. Accordingly, the adjustment range of the sensor output may be made wider.

As below, the case where characteristics of the sensor element are adjusted by removing part or all of the adjustment electrode 551A will be representatively explained according to FIGS. 13A to 13C.

First, the leakage output (zero point output) is measured.

Then, whether or not coarse adjustment is necessary is determined based on the measurement result.

If the determination such that the coarse adjustment is necessary has been made, for example, as shown in FIG. 13A, of the plural branch parts 61 of the adjustment electrode 551A, the necessary number of branch parts 61 located at the base end side of the adjustment vibrating arm 241A is cut.

Here, with respect to each branch part 61, the amounts of reduction of the adjustment output T by the cutting are obtained by experiments, calculations, or the like in advance, and thereby, the number and the locations of the branch parts 61 to be cut may be appropriately determined based on the measured zero point output.

Further, the cutting of the branch parts 61 may be performed using laser, for example, but not particularly limited thereto.

After the coarse adjustment, the leakage output (zero point output) is measured again. Then, the measurement of the zero point output and the coarse adjustment are alternately repeated until the zero point output becomes less than a first set value.

On the other hand, if the determination such that the coarse adjustment is not necessary has been made, whether or not fine adjustment is necessary is determined based on the measured zero point output.

If the determination such that the fine adjustment is necessary has been made, for example, as shown in FIGS. 13B and 13C, of the plural branch parts 61 of the adjustment electrode 551A, the necessary number of branch parts 61 located at the tip end side of the adjustment vibrating arm 241A is cut. Note that FIG. 13B shows the case where the coarse adjustment is not performed, but the fine adjustment is performed, and FIG. 13C shows the case where the coarse adjustment is performed, and then, the fine adjustment is performed. Further, FIGS. 13B and 13C show the cases where the narrower parts 62 of the branch parts 61 are cut, however, the intermediate part of the common part 60 may be cut. Thereby, the electrode area of the adjustment electrode 551A may be reduced by the amount of the plural branch parts 61 by one cutting.

Here, like the coarse adjustment, with respect to each branch part 61, the amounts of reduction of the adjustment output T by the cutting are obtained by experiments, calculations, or the like in advance, and thereby, the number and locations of the branch parts 61 to be cut may be appropriately determined based on the measured zero point output.

After the fine adjustment, the leakage output (zero point output) is measured again. Then, the measurement of the zero point output and the fine adjustment are alternately repeated until the zero point output becomes less than a second set value.

On the other hand, if the determination such that the fine adjustment is not necessary is made, the characteristics adjustment of the sensor element is ended.

Using the above described sensor element according to the second embodiment, advantageous detection sensitivity may be exerted simply and reliably.

The above described sensor devices of the respective embodiments may be incorporated into various electronic apparatuses for use.

According to the electronic apparatus, advantageous reliability may be obtained.

Electronic Apparatus

Next, examples of an electronic apparatus including the electronic device according to the embodiment of the invention will be explained in detail with reference to FIGS. 14 to 16.

Figure 14:
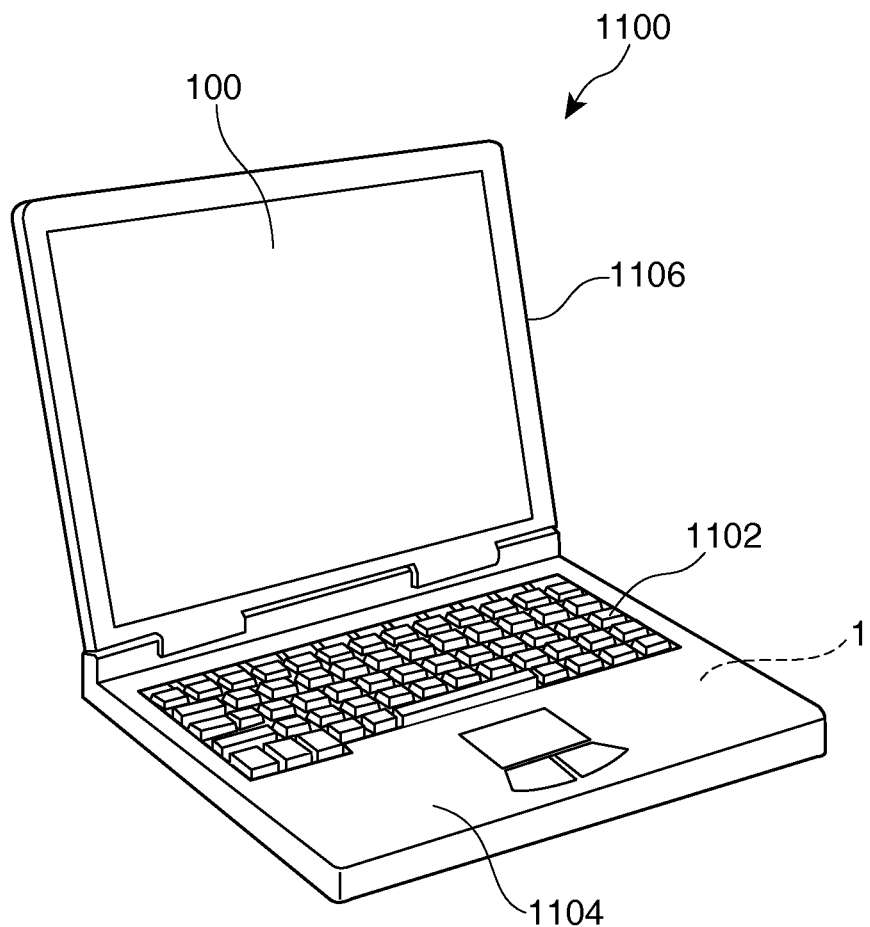
FIG. 14 is a perspective view showing a configuration of a mobile (or notebook) personal computer to which an electronic apparatus of the invention is applied.

FIG. 14 is a perspective view showing a configuration of a mobile (or notebook) personal computer to which the electronic apparatus according to the embodiment of the invention is applied.

In the drawing, a personal computer 1100 includes a main body unit 1104 having a keyboard 1102 and a display unit 1106 having a display part 100, and the display unit 1106 is rotatably supported via a hinge structure part with respect to the main body unit 1104.

The personal computer 1100 contains the above described sensor device 1 that functions as a gyro sensor.

Figure 15:
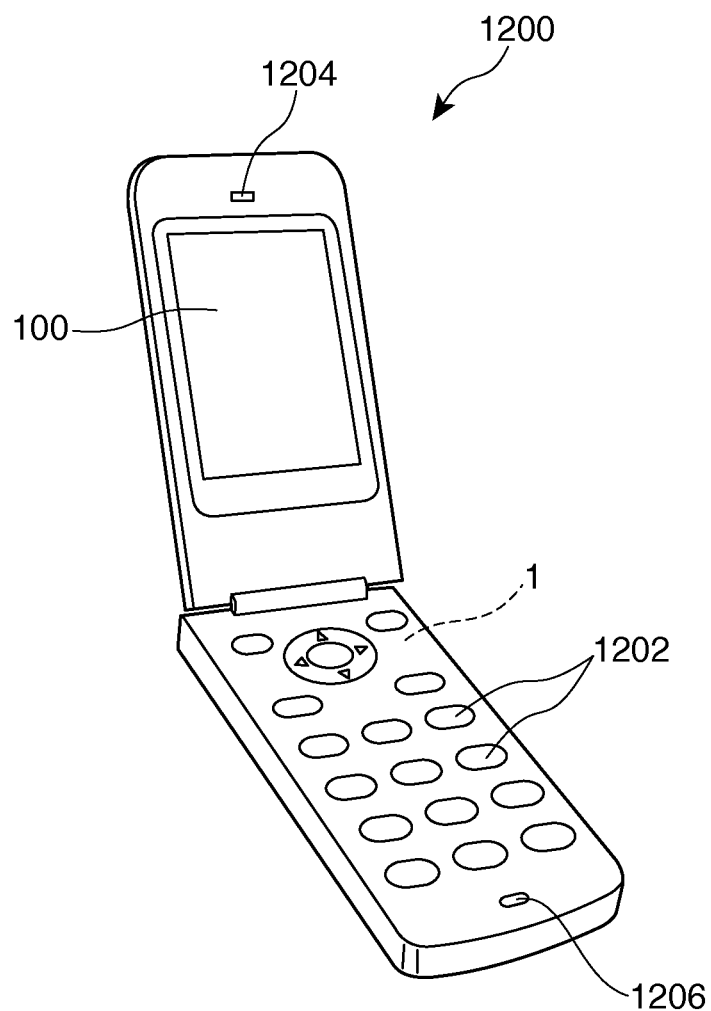
FIG. 15 is a perspective view showing a configuration of a cellular phone (including a PHS) to which the electronic apparatus of the invention is applied.

FIG. 15 is a perspective view showing a configuration of a cellular phone (including a PHS) to which the electronic apparatus according to the embodiment of the invention is applied.

In the drawing, a cellular phone 1200 includes plural operation buttons 1202, an ear piece 1204, and a mouthpiece 1206, and a display part 100 is provided between the operation buttons 1202 and the ear piece 1204.

The cellular phone 1200 contains the above described sensor device 1 that functions as a gyro sensor.

Figure 16:
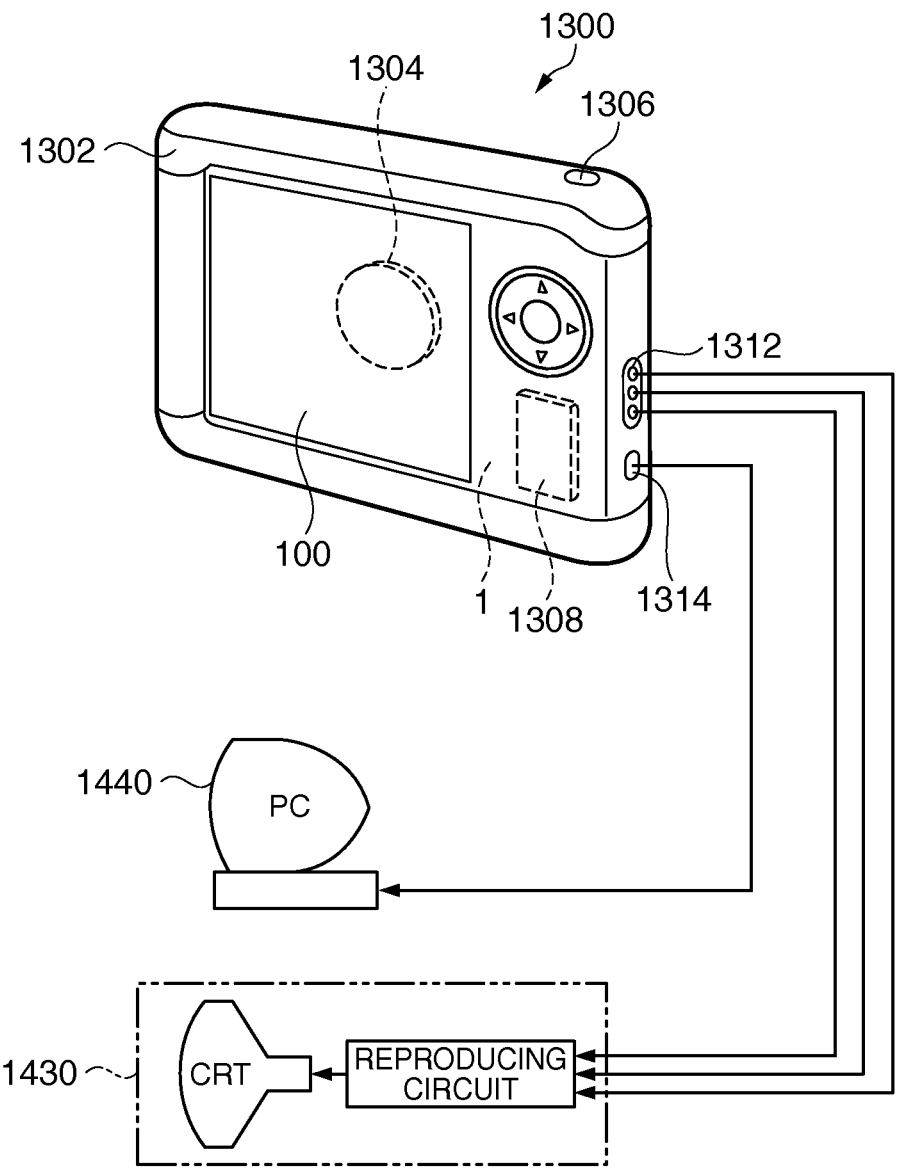
FIG. 16 is a perspective view showing a configuration of a digital still camera to which the electronic apparatus of the invention is applied.

FIG. 16 is a perspective view showing a configuration of a digital still camera to which the electronic apparatus according to the embodiment of the invention is applied. Note that, in the drawing, connection to an external device is simply shown.

Here, in a typical camera, a silver halide photographic film is exposed to light by an optical image of a subject, on the other hand, a digital still camera 1300 photoelectrically converts an optical image of a subject using an image sensing device such as a CCD (Charge Coupled Device) and generates imaging signals (image signals).

On a back surface of a case (body) 1302 in the digital still camera 1300, a display part is provided and adapted to display based on the imaging signals by the CCD, and the display part functions as a finder that displays the subject as an electronic image.

Further, on the front side (the depth side in the drawing) of the case 1302, a light receiving unit 1304 including an optical lens (imaging system), the CCD, etc. is provided.

When a photographer checks the subject image displayed on the display part and presses down a shutter button 1306, the imaging signals of the CCD at the time are transferred and stored into a memory 1308.

Further, in the digital still camera 1300, a video signal output terminal 1312 and an input/output terminal for data communication 1314 are provided on the side surface of the case 1302. Furthermore, as shown in the drawing, a television monitor 1430 is connected to the video signal output terminal 1312 and a personal computer 1440 is connected to the input/output terminal for data communication 1314, respectively, according to need. In addition, by predetermined operation, the imaging signals stored in the memory 1308 are output to the television monitor 1430 and the personal computer 1440.

The digital still camera 1300 contains the above described sensor device 1 that functions as a gyro sensor.

Note that the electronic apparatus according to the embodiment of the invention may be applied not only to the personal computer (mobile personal computer) in FIG. 14, the cellular phone in FIG. 15, and the digital still camera in FIG. 16 but also to a vehicle body position detection device, a pointing device, a head-mounted display, an inkjet ejection device (for example, an inkjet printer), a laptop personal computer, a television, a video camera, a video tape recorder, a navigation system, a pager, a personal digital assistance (with or without communication function), an electronic dictionary, a calculator, an electronic game machine, a game controller, a word processor, a work station, a videophone, a security television monitor, electronic binoculars, a POS terminal, a medical device (for example, an electronic thermometer, a sphygmomanometer, a blood glucose meter, an electrocardiographic measurement system, an ultrasonic diagnostic system, or an electronic endoscope), a fish finder, various measurement instruments, meters and gauges (for example, meters for vehicles, airplanes, and ships), a flight simulator, etc. in response to the types of the electronic device.

The sensor element, the sensor device, and the electronic apparatus according to the embodiment of the invention have been explained according to the illustrated embodiments, however, the invention is not limited to those.

Further, in the sensor element, the sensor device, and the electronic apparatus according to the embodiment of the invention, the configurations of the respective parts may be replaced by arbitrary configurations that exert the same functions, and arbitrary configurations may be added.

Furthermore, in the sensor element, the sensor device, and the electronic apparatus according to the embodiment of the invention, arbitrary configurations of the above described embodiments may be combined.

In the above described embodiments, the cases where the adjustment vibrating arms flexurally vibrate in the x-axis direction have been explained as examples, however, the invention may be applied to the case where the adjustment vibrating arms flexurally vibrate in the z-axis direction. In this case, the arrangement of the pair of first adjustment electrodes and the pair of second adjustment electrodes and the electrical connection to the pair of detection electrodes may be appropriately set in response to the piezoelectric property of the adjustment vibrating arms.

Further, in the above described embodiments, the cases where the invention is applied to the H-shaped tuning fork sensor element have been explained as examples, however, the invention may be applied to various sensor elements (gyro elements) such as a double T-shaped tuning fork, a double tuning fork, a triple tuning fork, a comb-teeth-shaped tuning fork, an orthogonal tuning fork, and a prismatic tuning fork.

Further, the numbers of the drive vibrating arms, the detection vibrating arms, and the adjustment vibrating arms may be respectively one, three, or more. Furthermore, the drive vibrating arms may also serve as the detection vibrating arms.

The number, locations, shapes, sizes, etc. of the drive electrodes are not limited to those of the above described embodiments as long as they may vibrate the drive vibrating arms by energization.

Further, the number, locations, shapes, sizes, etc. of the detection electrodes are not limited to those of the above described embodiments as long as they may electrically detect the vibrations of the drive vibrating arms by application of physical quantities.

Furthermore, the numbers, locations, shapes, sizes, etc. of the first adjustment electrodes and the second adjustment electrodes are not limited to those of the above described embodiments as long as they may output the charge generated with vibrations of the first adjustment vibrating arms and the second adjustment vibrating arms.

What is claimed is:

1. A sensor element comprising:
a base part;
a first arm extended from the base part and capable of drive-vibrating;
a second arm extended from the base part, the second arm vibrating as a result of the drive-vibrating of the first arm;
a first electrode provided on the second arm and the first electrode capable of generating a first signal with the vibration of the second arm;
a second electrode provided on the second arm and the second electrode capable of generating a second signal having an opposite phase to the first signal with the vibration of the second arm; and
a detection part containing a detection electrode configured to output a third signal in response to a physical quantity applied to the first arm,
wherein the first electrode and second electrode are electrically connected to the detection electrode such that a sum of the first signal and the second signal are superposed on the third signal, and
wherein the sum of the first signal and the second signal has an opposite phase to the third signal generated from the detection electrode when no physical quantity is applied to the first arm.

2. The sensor element according to claim 1, wherein the second arm has a first surface, a second surface opposite to the first surface, a pair of side surfaces connecting the first surface and the second surface,
the first electrode includes first principal surface electrodes provided on the first surface and the second surface, and a first side surface electrode provided on one of the side surfaces along an extension direction of the second arm, and
the second electrode includes second principal surface electrodes provided on the first surface and the second surface side by side with the first electrodes, and a second side surface electrode provided on the other of the side surfaces along the extension direction of the second arm.

3. The sensor element according to claim 1, wherein a mass adjustment part is provided in a tip end part of the second arm.

4. The sensor element according to claim 1, wherein at least one of the first electrode and the second electrode includes a common part provided along an extension direction of the second arm and plural branch parts branched from the common part.

5. The sensor element according to claim 4, wherein, in the plural branch parts, an electrode width at a tip end side is larger than a common part side.

6. The sensor element according to claim 4, wherein the branch parts are tilted with respect to the extension direction of the common part.

7. The sensor element according to claim 4, wherein the second arm has a groove part provided along the extension direction, and
at least a part of the branch parts is provided on a wall surface of the groove part.

8. The sensor element according to claim 1, further comprising a third arm extended from the base part and capable of vibrating in response to the physical quantity applied to the first arm,
wherein the detection electrode is provided on the third arm.

9. A sensor device comprising:
the sensor element according to claim 1;
a circuit that drives the sensor element; and
a circuit that detects an output from the detection part.

10. A sensor device comprising:
the sensor element according to claim 2;
a circuit that drives the sensor element; and
a circuit that detects an output from the detection part.

11. A sensor device comprising:
the sensor element according to claim 3;
a circuit that drives the sensor element; and
a circuit that detects an output from the detection part.

12. An electronic apparatus comprising the sensor element according to claim 1.

13. An electronic apparatus comprising the sensor element according to claim 2.

14. An electronic apparatus comprising the sensor element according to claim 3.

15. The sensor element according to claim 1, wherein the physical quantity is an angular velocity.

16. A manufacturing method of a sensor element, the sensor element including
a base part,
a first arm extended from the base part and drive-vibrating,
a second arm extended from the base part and vibrating as a result of the drive-vibrating of the first arm,
a first electrode provided on the second arm and generating a first signal with the vibration of the second arm, and
a second electrode provided on the second arm and generating a second signal having an opposite phase to the first signal with the vibration of the second arm,
a detection part containing a detection electrode that outputs a third signal in response to a physical quantity applied to the first arm,
wherein the first electrode and the second electrode are electrically connected to the detection electrode such that a sum of the first signal and the second signal are superposed on the third signal,
the method comprising adjusting an amount of charge generated in the first electrode or the second electrode by removing part or all of the first electrode or the second electrode.

17. The method according to claim 16, further comprising:
measuring charge generated in the detection electrode under a condition that the first arm is energized and vibrated; and
adjusting a resonance frequency of the second arm based on a measurement result thereof.

18. The sensor element according to claim 1, wherein the physical quantity is an angular velocity.

19. The method according to claim 16, wherein the physical quantity is an angular velocity.

20. A sensor element comprising:
a base part;
a pair of first arms extended from the base part and capable of drive-vibrating;
a pair of second arms extended from the base part and vibrating as a result of the drive-vibrating of the pair of first arms;
a pair of third arms extended from the base part and vibrating in response to a physical quantity applied to the pair of first arms;
a first electrode provided on each of the pair of second arms and generating a first signal corresponding to the vibration of the pair of second arms;
a second electrode provided on each of the pair of second arms and generating a second signal having an opposite phase to the first signal; and
a third electrode provided on each of the pair of third arms and generating a third signal in response to the physical quantity applied to the pair of first arms,
wherein the first electrode and second electrode are electrically connected to the third electrode such that a sum of the first signal and the second signal are superposed on the third signal, and
wherein the sum of the first signal and the second signal has an opposite phase to the third signal when no physical quantity is applied to the pair of first arms.

21. The sensor element according to claim 20, further comprising a mass adjustment part provided in a tip end part of each of the pair of second arms.

22. The sensor element according to claim 20, wherein at least one of the first electrode and the second electrode includes a common part provided along an extension direction of the pair of second arms and a plurality of branch parts extending from the common part, the branch parts including at least one of:
an electrode having a width at a tip end side that is larger than a width at a common part side,
a tilt along the branch part, the branch part being tilted with respect to an extension direction of the common part, and
at least a portion of the plurality of branch parts being provided on a wall surface of a groove provided in each of the pair of second arms, the groove extending in an extension direction of each of the pair of second arms.

23. The sensor element according to claim 20, wherein the physical quantity is an angular velocity.

* * * * *